(12) United States Patent
Kim

(10) Patent No.: US 12,481,089 B2
(45) Date of Patent: Nov. 25, 2025

(54) LENS ASSEMBLY AND ELECTRONIC DEVICE INCLUDING THE SAME

(71) Applicant: SAMSUNG ELECTRONICS CO., LTD., Suwon-si (KR)

(72) Inventor: Dongwoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 438 days.

(21) Appl. No.: 18/075,007

(22) Filed: Dec. 5, 2022

(65) Prior Publication Data

US 2023/0176260 A1    Jun. 8, 2023

Related U.S. Application Data

(63) Continuation of application No. PCT/KR2022/019635, filed on Dec. 5, 2022.

(30) Foreign Application Priority Data

Dec. 3, 2021 (KR) .................. 10-2021-0172431
Mar. 11, 2022 (KR) .................. 10-2022-0031044

(51) Int. Cl.
| | | |
|---|---|---|
| G02B 3/00 | (2006.01) | |
| G02B 13/00 | (2006.01) | |
| G02B 13/18 | (2006.01) | |
| G02B 27/00 | (2006.01) | |

(52) U.S. Cl.
CPC ........ *G02B 3/0062* (2013.01); *G02B 13/0045* (2013.01); *G02B 13/18* (2013.01); *G02B 27/0025* (2013.01); *G02B 2003/0093* (2013.01)

(58) Field of Classification Search
CPC ........ G02B 3/0062; G02B 13/18; G02B 9/62; G02B 27/0025; G02B 13/0045; H04N 23/00
See application file for complete search history.

(56) References Cited

U.S. PATENT DOCUMENTS

2013/0342918 A1    12/2013  Kubota et al.
2014/0063323 A1    3/2014   Yamazaki et al.
(Continued)

FOREIGN PATENT DOCUMENTS

| JP | 2014-26254 A | 2/2014 |
|---|---|---|
| JP | 2019-66571 A | 4/2019 |

(Continued)

OTHER PUBLICATIONS

KR 102149983 B1 (Choi Byoung Suk) machine translation (Year: 2020).*

(Continued)

*Primary Examiner* — James A Dudek
(74) *Attorney, Agent, or Firm* — Sughrue Mion, PLLC

(57) ABSTRACT

Provided is an electronic device including: a lens assembly having multiple lenses arranged along an optical axis direction from an object side to an image side, the lens assembly including a first lens parallel to the optical axis direction and having a convex surface facing the object side in a first direction, a second lens having a convex surface facing the first direction, a third lens having a positive refractive power, a fourth lens, a fifth lens have a positive refractive power, and a sixth lens; and an image sensor including an imaging plane on which an image is formed. The electronic device may be implemented as a small-sized and high pixel optical device.

18 Claims, 20 Drawing Sheets

(56) References Cited

U.S. PATENT DOCUMENTS

| | | |
|---|---|---|
| 2015/0168677 A1 | 6/2015 | Lee et al. |
| 2016/0004042 A1 | 1/2016 | Kubota et al. |
| 2018/0149836 A1 | 5/2018 | Ko |
| 2019/0212527 A1 | 7/2019 | Jung et al. |
| 2019/0265438 A1 | 8/2019 | Sekine et al. |
| 2019/0331894 A1 | 10/2019 | Fang et al. |
| 2019/0346665 A1 | 11/2019 | Kubota et al. |
| 2020/0012079 A1 | 1/2020 | Park |
| 2020/0209577 A1 | 7/2020 | Teraoka et al. |
| 2020/0348492 A1 | 11/2020 | Huh et al. |
| 2020/0409053 A1 | 12/2020 | Sun et al. |
| 2021/0132344 A1 | 5/2021 | Huang |
| 2021/0263272 A1 | 8/2021 | Yamazaki et al. |

FOREIGN PATENT DOCUMENTS

| | | |
|---|---|---|
| JP | 6497470 B1 | 4/2019 |
| JP | 2019-152774 A | 9/2019 |
| JP | 6808786 B2 | 1/2021 |
| KR | 10-2014-0071869 A | 6/2014 |
| KR | 10-2015-0070858 A | 6/2015 |
| KR | 10-2019-0084536 A | 7/2019 |
| KR | 10-2149983 B1 | 8/2020 |
| KR | 10-2020-0127484 A | 11/2020 |
| WO | 2014/175058 A1 | 10/2014 |

OTHER PUBLICATIONS

International Search Report (PCT/ISA/210) dated Mar. 10, 2023, issued by International Searching Authority for International Application No. PCT/KR2022/019635.

Written Opinion of the International Searching Authority (PCT/ISA/237) dated Mar. 10, 2023, issued by International Searching Authority for International Application No. PCT/KR2022/019635.

Communication issued on Dec. 2, 2024 by the European Patent Office for European Patent Application No. 22901899.9.

* cited by examiner

LENS ASSEMBLY AND ELECTRONIC DEVICE INCLUDING THE SAME

CROSS-REFERENCE TO RELATED APPLICATIONS

This application is a bypass continuation of PCT International Application No. PCT/KR2022/019635, which was filed on Dec. 5, 2022, and claims priority to Korean Patent Application No. 10-2021-0172431, filed on Dec. 3, 2021, in the Korean Intellectual Property Office, and Korean Patent Application No. 10-2022-0031044, filed on Mar. 11, 2022, in the Korean Intellectual Property Office, the disclosures of which are incorporated herein by reference in their entireties.

BACKGROUND

1. Field

The disclosure relates to a lens assembly which can be mounted on a small electronic device, and more particularly to a lens assembly having a compact size such that the lens assembly may be mounted on a small electronic device, and also having a high-pixel performance, and an electronic device including the lens assembly.

2. Description of Related Art

There is widespread use of optical devices, such as cameras capable of capturing images or videos. In particular, digital cameras or video cameras having solid-state image sensors such as charge coupled devices (CCD) or complementary metal-oxide semiconductors (CMOS) have become widespread. Optical devices employing solid-state image sensors (CCD or CMOS) can store, copy, and move images more easily than film-type optical devices, and thus have gradually replaced film-type optical devices.

In order to acquire high-quality images and/or videos, an optical device may include a lens assembly including multiple lenses, and an optical system including an image sensor having a large number of pixels. The lens assembly may have, for example, a low F number (Fno) and a small aberration such that high-quality (high-resolution) images and/or videos can be acquired. In order to obtain a low F number (Fno) and a small aberration, in order words, in order to obtain high resolutions and bright images, it is necessary to combine multiple lenses. The pixel number increases in proportion to pixels included in the image sensor, and image sensors having a large pixel number can acquire high-resolution images and/or pictures. In order to implement a high-pixel image sensor in a limited mounting space of an electronic device, multiple pixels having a very small size (e.g., micrometer level) may be arranged. Recently, portable electronic devices (e.g., smartphones, tablets) are equipped with image sensors including tens of millions or hundreds of millions of micrometer-level pixels.

Such optical devices have become indispensable to electronic devices for providing various services and additional functions, and high-performance optical devices may advantageously attract users to buy electronic devices.

In line with demands for high-performance optical devices, image sensors mounted on electronic devices have evolved to include a combination of pixels having smaller sizes and increasing sensor size. However, there is a problem in that, if an electronic device is equipped with an optical device, the size of which is increased by the increased sensor size, the overall product size or the volume occupied by the optical device in the electronic device is increased, thereby degrading the portability of the electronic device.

Minimizing the occurrence of aberration may be crucial to designing an optical device. The aberration may refer to a phenomenon wherein, when rays of light from a point pass through an optical device (e.g., lens or reflecting mirror) and make an image on an imaging surface of an image sensor. That is, the rays do not concentrate at a point, and some of the rays make an image in deviating positions. For example, a near-axis ray close to the optical axis of a lens and a distant-axis ray far from the optical axis may not converge at a point when passing through the lens, making it difficult to obtain a clear image. Aberrations include chromatic aberration resulting from a difference in color of rays and mono chromatic aberration resulting from a difference in position or direction when single-color rays converge. The mono chromatic aberration occurs when blurred images are observed, and may include spherical aberration where rays parallel to an optical axis are focused in different positions when passing through a lens, coma aberration where an incident ray oblique with regard to an optical axis and another ray passing near the center of a lens propagate in different directions and make images at different points on an imaging surface, and astigmatism where rays have different refractive or reflective actions within a tangential plane or meridional plane and a sagittal plane of a lens and thus form image points in different conoid areas. The mono chromatic aberration may also include field curvature wherein a subject image is formed on a petzval surface, thereby making a plane appear curved, and distortion in which the horizontal magnification changes within an imaging surface, thereby distorting images. Provided are a lens assembly including a combination of multiple lenses to correct aberration and an electronic device including the same. A number of related technologies attempt to correct aberration through an appropriate combination of multiple lens assemblies. However, compact and/or lightweight electronic devices (for example, smartphones) have narrow inner spaces to mount optical devices, and it may thus be difficult both to be advantageous for aberration correction and to configure compact optical devices.

Various embodiments of the disclosure may provide a lens assembly which has high performance, little aberration, and is compact, and/or an electronic device including the lens assembly.

SUMMARY

According to various embodiments of the disclosure, an electronic device may include: a lens assembly having multiple lenses arranged in a direction along an optical axis from an object side to an image side, the lens assembly including a first lens having a convex surface facing the object side in a first direction parallel to the optical axis; a second lens having a convex surface facing the first direction; a third lens having a positive refractive power; a fourth lens; a fifth lens having a positive refractive power; and a sixth lens; and an image sensor including an imaging plane on which an image is formed.

The lens assembly and the electronic device including the lens assembly may satisfy [Equation 1] and [Equation 2] below, $$25 \leq V_{d3} \leq 50 \quad \text{[Equation 1]}$$

$$25 \leq V_{d5} \leq 50 \quad \text{[Equation 2]}$$

$V_{d3}$ of [Equation 1] is an Abbe's number of the third lens, and $V_{d5}$ of [Equation 2] is an Abbe's number of the fifth lens.

According to various embodiments of the disclosure, an electronic device may include: a lens assembly having multiple lenses arranged in a direction along an optical axis from an object side to an image side, the lens assembly including a first lens having a positive refractive power, parallel to the optical axis direction, having a convex surface facing the object side in a first direction, and having a first Abbe's number value; a second lens having a negative refractive power, having a convex surface facing the first direction, and having a second Abbe's number value; a third lens having a positive refractive power and having a third Abbe's number value; a fourth lens having a negative refractive power and having a fourth Abbe's number; a fifth lens having a positive refractive power and having a fifth Abbe's number value; and a sixth lens having a negative refractive power and having a sixth Abbe's number value; and an image sensor including an imaging plane on which an image is formed. The third Abbe's number value is smaller than the first Abbe's number value and is larger than the second Abbe's number value, and wherein the fifth Abbe's number value is smaller than the sixth Abbe's number value, and is larger than the fourth Abbe's number value.

According to various embodiments of the disclosure, in order to exhibit high performance, six lens assemblies and an image sensor having a large image height may be included, while having a small abbe's number, such that the entire optical system has a minimally designed length. As a result, an electronic device including the optical system can easily have a small size. For example, according to various embodiments of the disclosure, the lens assembly can be easily mounted on an electronic device which is compact and/or lightweight (e.g., smartphone), and may contribute to expansion of the optical function of the electronic device or improvement of optical performance thereof.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
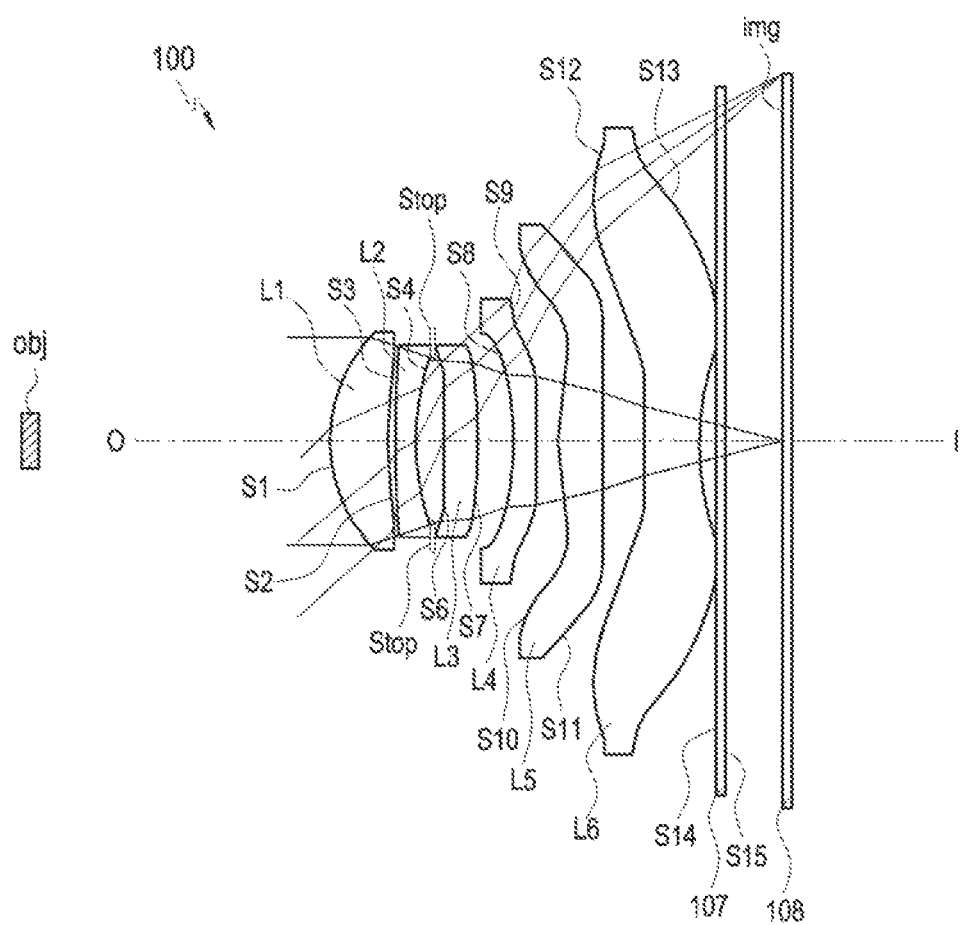
FIG. 1 is a diagram illustrating a lens assembly, according to an embodiment.

Hereinafter, various embodiments of the disclosure will be described in detail with reference to the accompanying drawings.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

Expressions such as "first," "second," "1st," "2nd" and so on used herein may be used to refer to various elements regardless of order and/or importance, and it should be noted that the expressions are merely used to distinguish an element from another element and not to limit the relevant elements.

According to various embodiments, an electronic device may include at least one of, for example, a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), a MP3 player, a medical device, a camera, and a wearable device. The wearable device may include at least one of an accessory type (e.g., watch, ring, bracelet, anklet, necklace, glasses, contact lens, or head-mounted device (HMD)), a fabric or clothing-integrated type (e.g., electronic clothing), a body-mounted type (e.g., skin pad, or tattoo), and a bio-implantable circuit. According to some embodiments, the electronic device may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to various embodiments, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, a drone, an ATM in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.). According to some embodiments, the electronic device may include at least one of a part of furniture or a building/structure, an electronic board, an electronic signature receiving device, a projector, and various kinds of measuring instruments (e.g., water meter, electric meter, gas meter, radio wave meter, etc.). In various embodiments, the electronic device may be flexible, or may be a combination of one or more of the aforementioned various devices. The electronic device according to various embodiments of the disclosure is not limited to the aforementioned devices. In various embodiments of the disclosure, the term "user" may refer to a person using an electronic device or a device (e.g., artificial intelligence electronic device) using an electronic device. The electronic device according to embodiments of the disclosure is not limited to the aforementioned devices.

According to various embodiments, a typical example of the electronic device may include an optical device (e.g., camera module), and the following description may be based on an embodiment in which a lens assembly is mounted to the optical device.

In describing various embodiments of the disclosure, some numerical values may be presented, but it should be noted that these numerical values do not limit various embodiments of the disclosure unless set forth in the claims.

FIG. 1 is a diagram illustrating a lens assembly 100 according to an embodiment.

Referring to FIG. 1, the lens assembly 100 may include multiple lenses (e.g., L1, L2, L3, L4, L5, and L6) and an image sensor 108.

According to various embodiments, the image sensor 108 may be mounted to an electronic device. The lens assembly 100 including multiple lenses (e.g., L1, L2, L3, L4, L5, and L6) may be mounted in the electronic device and/or the optical device in which the lens assembly 100 is mounted. For example, in describing various embodiments of the disclosure, the image sensor 108 is provided in the lens assembly 100, but the image sensor 108 may be used by being mounted in the electronic device and/or the optical device in which the lens assembly 100 is mounted.

According to various embodiments, the image sensor 108 may be a sensor mounted in a printed circuit board and aligned with an optical axis O-I, and may respond to light.

For example, the image sensor 108 may include a sensor such as a complementary metal-oxide semiconductor (CMOS) image sensor or a charge coupled device (CCD). The image sensor 108 is not limited thereto, and may include, for example, various elements for converting an object image into an electric image signal. The image sensor 108 may obtain contrast information, gradation ratio information, color information, and the like regarding an object, from the light having penetrated the multiple lens (e.g., L1, L2, L3, L4, L5, and L6), to obtain an image of the object.

According to various embodiments, the multiple lens (e.g., L1, L2, L3, L4, L5, and L6) included in the lens assembly 100 may include a plastic lens, and the lens assembly 100 may have an angle of view of about 85 degrees or more through a combination of the lenses. In addition, the image sensor 108 may have a size of 4.8 mm or more in image height and may be configured to allow arrangement of tens of millions to hundreds of millions of pixels, for example, 108 million or more pixels. For reference, the image height may mean half of the diagonal length of an image sensor which is formed in an approximately rectangular shape (e.g., a square) with the optical axis as a normal line and has a thin thickness.

According to various embodiments, the lens assembly 100 may have an optical axis O-I from an object (or external object) side O to an image side I. In a description for illustrating configuration of each lens below, for example, an object side may indicate a direction in which an object obj is located and an image side may indicate a direction in which an imaging plane img on which an image is formed is located. In addition, "a surface facing an object side" may indicate a surface of the object obj side with reference to the optical axis O-I and a left side surface (or a front surface) of a lens in the drawings according to various embodiments of the disclosure, "a surface facing an image side" may indicate a surface of an imaging plane img with reference to the optical axis O-I and a right side surface (or a rear surface) of a lens in the drawings. The imaging plane img may be a portion in which a photographing element or the image sensor 108 is disposed to form an image.

Based on at least one lens of the multiple lenses included in the lens assembly 100, facing the object side O along the optical axis O-I may be defined as facing a first direction and facing the image side I along the optical axis O-I may be defined as facing a second direction. According to various embodiments, when it is described that a lens (e.g., a first lens L1) includes a surface facing the object side O, the surface facing the object side O may be said to face the first direction. According to various embodiments, when it is described that a lens (e.g., a first lens L1) includes a surface facing the image side I, the surface facing the image side I may be said to face the second direction.

Referring to FIG. 1, the lens assembly 100 according to various embodiments may include, as the multiple lenses (e.g., L1, L2, L3, L4, L5, and L6) sequentially arranged in the optical axis O-I direction (e.g., a direction facing from the object O to the image I side in FIG. 1), a first lens L1, a second lens L2, a third lens L3, a fourth lens L4, a fifth lens L5, and a sixth lens L6. The multiple lens (e.g., L1, L2, L3, L4, L5, and L6) may be arranged in an optical axis alignment with the image sensor 108.

In a description for illustrating the multiple lenses (e.g., L1, L2, L3, L4, L5, and L6) according to various embodiments, in each lens, a side close to the optical axis O-I may be referred to as a "chief portion" and a side far from the optical axis O-I (or a peripheral portion of a lens) may be referred to as a "marginal portion". The chief portion may be, for example, a portion intersecting the optical axis O-I in the first lens L1. The marginal portion may be, for example, a portion spaced a predetermined distance apart from the optical axis O-I in the first lens L1. The marginal portion may include, for example, an end portion of a lens farthest from the optical axis O-I in the first lens L1.

According to various embodiments, the first lens L2 included in the lens assembly 100 may have positive refractive power and the second lens L2 may have negative refractive power to configure a small optical device. The sixth lens L6 may have negative refractive power. In the above-described embodiments, when light parallel to the optical axis O-I is incident to a lens having positive refractive power, the light having penetrated the lens may be concentrated. For example, a lens having positive refractive power may be a lens based on a convex lens principle. In other hands, when parallel light is incident to a lens having negative refractive power, the light having penetrated the lens may be dispersed. For example, a lens having negative refractive power may be a lens based on a concave lens principle.

According to various embodiments, a surface S1 of the first lens L1 facing the object side O may be formed to be convex, a surface S3 of the second lens L2 facing the object side O may also be formed to be convex, and a surface S12 of the second lens L6 facing the object side O may be formed to be convex, as well. By configuring the first lens L1, the second lens L2, and the sixth lens L6 as meniscus lenses which have surfaces S2, S4, S13 facing the image side I formed to be concave, a coma aberration and an astigmatism which are phenomena of preventing a clear image from forming through a marginal portion of a lens may be effectively eliminated. For example, the first lens L1 may be configured to be a meniscus lens having a convex surface S1 facing the object side O and a concave surface S2 facing the image side I, and the second lens L2 may be also configured to be a meniscus lens having a convex surface S3 facing the object side O and a concave surface S4 facing the image side I. The sixth lens L6 may be also configured to be a meniscus lens having a convex surface S12 facing the object side O and a concave surface S13 facing the image side I.

According to various embodiments, the first lens L1 and the second lens L2 may be configured to be small-diameter lenses having a relatively small effective diameter in the lens assembly formed of six pieces. The "effective diameter" may mean a distance between one end and other end of a lens in a direction perpendicular to the optical axis O-I. A lens needs to be installed in a limited space in an optical device and/or an electronic device and thus the first lens L1 and the second lens L2 are configured to be small-diameter lenses while the first lens L1 is configured to be a lens having positive refractive power and the second lens L2 having a negative refractive index, so as to achieve the effect of reducing an overall length of an optical system.

According to various embodiments, at least one of surfaces S1, S2, S3, S4 of the first lens L1 and the second lens L2 may be formed to be aspheric. A spherical aberration which may occur on the first lens L1 and the second lens L2 may be prevented by configuring at least one of surfaces S1, S2, S3, S4 of the first lens L1 and the second lens L2 to be aspheric. In various embodiments to be described below, it may be exemplified that at least one surface of the first lens L1, the second lens L2, and the sixth lens L6 is implemented to be aspheric. Each surface S1, S2 of the first lens L1, each surface S3, S4 of the second lens L2, and each surface S12, S13 of the sixth lens L6 may be formed to have different curvatures.

According to various embodiments, a radius of curvature, a thickness, a total track length (TTL), a focal length, and the like, of a lens of the disclosure may have a unit of millimeters (mm) unless otherwise specified. A thickness of a lens, a distance between lenses, a TTL (or an overall length (OAL)) may be a length measured with reference to the optical axis of the lenses. In a description of a lens shape, the convex shape of one surface may mean that an optical axis portion of the corresponding surface is convex, and the concave shape of one surface may mean that an optical axis portion of the corresponding surface is concave. Even if one surface (an optical axis portion of the corresponding surface) of the lens is described to have a convex shape, a peripheral portion (a portion spaced a predetermined distance apart from the optical axis portion of the corresponding surface) may be concave. Similarly, even if one surface (an optical axis portion of the corresponding surface) of the lens is described to have a concave shape, a peripheral portion (a portion spaced a predetermined distance apart from the optical axis portion of the corresponding surface) may be convex. An inflection point in the specification and claims below may mean a point at which a radius of curvature is changed in a portion not intersecting the optical axis. The inflection point may be located at a point at which one surface of the lens is changed from a convex shape into a concave shape or one surface of the lens is changed from a concave shape into a convex shape. According to various embodiments, the surface S12 of the sixth lens L6 facing the object side O may have two inflection points at a marginal portion thereof and the surface S13 facing the image side I may have one inflection point at a marginal portion thereof.

According to various embodiments, the third lens L3, the fourth lens L4, and the fifth lens L5 may be sequentially arranged between the second lens L2 and the sixth lens L6. According to an embodiment, the third lens L3 may be configured to have positive refractive power, the fourth lens L4 may be configured to have negative refractive power, and the fifth lens L5 may be configured to have positive refractive power.

According to various embodiments, the surface S6 of the sixth lens L3 facing the object side O may be configured to be convex and the surface S8 of the fourth lens L4 facing the object side O may be configured to be concave. According to an embodiment, in the third lens L3, not only the surface S6 facing the object side O but also the surface S7 facing the image side I may be configured to be convex. In addition, the surface S6 of the third lens L3 facing the object side O may have a convex shape in the chief portion and a concave shape in the marginal portion. That is, the surface S6 of the third lens L3 facing the object side O may have an inflection point. According to various embodiments, the fifth lens L5 may be formed to have a biconvex lens shape having both the surface S10 and the surface S11 facing the object side O and the image side I, respectively. The chief portion of the surface S10 facing the object side O may be formed to be convex and the marginal portion is formed to be concave. That is, the surface S10 of the fifth lens L5, facing the object side O may have an inflection point.

According to various embodiments, the first lens L1 and the second lens L2 may be configured to be lenses having a small effective diameter to reduce the size of an optical device and the sixth lens L6 may be configured to be a lens having a relatively large effective diameter compared to other lenses and corresponding to the image sensor 108 having a big size to provide high-resolution. According to an embodiment, the sixth lens L6 may have the largest effective diameter in the lens assembly 100. The third lens L3, the fourth lens L4, and the fifth lens L5 having gradually larger effective diameter and large refractive power are sequentially arranged between the second lens L2 and the sixth lens L6 so that aberration may be effectively corrected.

According to an embodiment, the lens assembly 100 may be composed of six lenses having positive, negative, positive, negative, positive, negative refractive power and one filter 107 (e.g., an IR filter) sequentially from the object side. Therefore, it is possible to provide an optical system having a field of view of about 85 degrees and capable of securing performance up to an image height of 4.8 mm so that a high-pixel sensor having, for example, 108 million or more pixels may be applied thereto. When the optical system is mounted to an actuator capable of auto focusing, it is possible to photograph an area having an infinity focal length to a macro area of about 10 cm. An optical device may be implemented in a small size through a minimum configuration of six lenses while employing a high-pixel sensor of 108M or more so that an increase in the size of an electronic device including the optical device (e.g., a camera module) mounted thereto may be minimized.

According to various embodiments, the lens assembly 100 may be implemented as lenses composed of synthetic resin (e.g., plastic) and each having a predetermined refractive index. Multiple lenses composed of a synthetic resin material may have a high degree of design freedom in size and shape. For example, in refractive index at a specific wavelength (e.g., 587.6000 nm) of visible light, the third lens L3 may be formed to have a refractive index of more than 1.55 and less than 1.63 and the fourth lens L4 may be formed of a synthetic lens formed to have a refractive index of 1.62 or more while the first lens L1 is formed of a synthetic lens having a refractive index of 1.55 or less, and the second lens L2 is formed of a synthetic lens having a refractive index of 1.66 or more. In addition, the fifth lens L5 may be formed to have a refractive index of more 1.55 and less than 1.63 and the sixth lens L6 may be formed to have a refractive index of less than 1.55. The refractive index of the third lens L3 and the refractive index of the fifth lens L5 may be larger than the refractive index of the first lens L1 and the refractive index of the sixth lens L6. In addition, the refractive index of the third lens L3 and the refractive index of the fifth lens L5 may be smaller than the refractive index of the second lens L2. Furthermore, the refractive index of the third lens L3 and the refractive index of the fifth lens L5 may be formed to be smaller than the refractive index of the fourth lens L4 according to an embodiment. Through the design of the refractive indices, a lens assembly and/or an electronic device including the lens assembly may be reduced in size. According to an embodiment, in a lens formed of a synthetic resin (e.g., plastic), an Abbe's number may be prone to increase or decrease conversely as a refractive index decreases or increases. For example, the Abbe's number at a specific wave length (e.g., 587.6000 nm) of visible light in a lens formed of a synthetic resin (e.g., plastic) is not like the refractive index, and the third Abbe's number value and the fifth Abbe's number value may appear smaller than the first Abbe's number value and the sixth Abbe's number value, respectively and larger than the second Abbe's number value and the fourth Abbe's number value, respectively. Accordingly, in a description of the lens assembly with respect to various embodiments of the disclosure, a description regarding a refractive index may be replaced by a description regarding an Abbe's number.

According to various embodiments, in case of multiple lenses (e.g., L1, L2, L3, L4, L5, and L6) included in the lens assembly 100, the shorter an interval between one lens and another adjacent lens, the shorter the overall length (the overall length of the lens assembly in the optical axis direction) of the lens assembly 100. For example, when an optical device and/or an electronic device including the lens assembly 100 according to various embodiments of the disclosure is desired to be manufactured in a small size, it is advantageous to maintain the overall length of the lens assembly 100 as short as possible. However, there is a physical limitation to shorten the overall length of the lens assembly 100 while securing an appropriate telephoto ratio. According to various embodiments of the disclosure, intervals between the multiple lenses (e.g., L1, L2, L3, L4, L5, and L6) may be variously designed according to optical characteristics (e.g., Aberration characteristics, wide-angle characteristics and/or brightness characteristics) required for the lens assembly 100.

According to various embodiments, the lens assembly 100 may include at least one stop. By adjusting a size of the stop, an amount of light reaching the imaging plane img of the image sensor 108 may be adjusted. According to an embodiment, the stop may be located between the second lens L2 and the third lens L3. According to various embodiments, a small-size optical system able to respond to a high pixel sensor may be formed by disposing the stop for determining a F number Fno of the whole optical system between the second lens L2 and the third lens L3 and adjusting specifications of the fourth lens L4 and the fifth lens L5.

According to various embodiments, the lens assembly 100 may further include a filter 107 disposed between the sixth lens L6 and the image sensor 108. The filter 107 may block light, for example, infrared light, detected by a film or an image sensor of an optical device. The filter 107 may include, for example, at least one of a low pass filter or a cover glass. For example, when the filter 107 is mounted, a color of an image and the like detected and photographed through the image sensor 108 may be made close to a color that a person feels when he or she sees an actual object. In addition, the filter 107 may allow visible light to penetrate and infrared light to be emitted outside so as to prevent infrared light from transferring to the imaging plane img of the image sensor.

According to various embodiments, as the first lens L1, the second lens L2, and the sixth lens L6 are configured as meniscus lenses having the surfaces S1, S3, S12 thereof facing the object side O, the overall length OAL of the optical system may be reduced and a distortion and an astigmatism may be effectively corrected.

According to various embodiments, the third lens L3 and the fifth lens L5 may form positive refractive power. Furthermore, as the surface S6, S10 of the third lens L5 and the fifth lens L5 facing the object side O are also formed to have convex chief portions so that a spherical aberration may be effectively corrected. According to various embodiments, the fourth lens L4 has positive refractive power and the surface S6 facing the object side O is formed to be concave to appropriately distribute the refractive power so that performance degradation due to manufacturing errors may be reduced. According to various embodiments, as the surface S8 of the fourth lens L4 facing the object side O is formed to be concave while the fourth lens L4 has negative refractive power, the overall length of the optical system may be prevented from increasing and correction of an astigmatism of the marginal portion may be facilitated. Furthermore, the use of a synthetic resin (e.g., plastic) having a high dispersion value for the fourth lens L4 may effectively correct chromatic aberration which may be caused from the first lens L1, the second lens L2, and the third lens L3.

According to various embodiments, as the fifth lens L5 and the sixth lens L6 are formed to be aspheric, coma may be prevented from occurring in the marginal portion (e.g., a portion spaced apart from the optical axis of the image sensor 108) of the image sensor 108. Furthermore, as the surfaces S10, S12 of the fifth lens L5 and the sixth lens L6 facing the object side O have at least one inflection point, it is easy to control an astigmatism and possible to reduce occurrence of field curvature from the chief portion to the marginal portion of the imaging plane img of the image sensor.

According to various embodiments, the lens assembly 100 may be manufactured in a small size and effective for correction of chromatic aberration by arranging lenses to sequentially have positive, negative, positive, negative, positive, negative refractive power from the object side.

The above-described lens assembly 100 may be reduced in size and have high-performance optical characteristics by satisfying [Equation 1] and [Equation 2] below.

$$25 \leq V_{d3} \leq 50 \qquad \text{[Equation 1]}$$

$$25 \leq V_{d5} \leq 50 \qquad \text{[Equation 2]}$$

$V_{d3}$ of [Equation 1] may indicate an Abbe's number of the third lens L3 and $V_{d5}$ of [Equation 2] may indicate an Abbe's number of the fifth lens L5. When the Abbe's numbers of the third lens L3 and the fifth lens L5 are below the lower limit of above-described [Equation 1] and [Equation 2], it may enable the application of a material with relatively high refractive index among lens and thus advantageous to reduce a size. However, when the Abbe's numbers of the third lens L3 and the fifth lens L5 are below the lower limit of above-described [Equation 1] and [Equation 2], the low Abbe's numbers may cause increase in chromatic aberration and thus it may be difficult to secure optical system performance suitable for high pixels. When the Abbe's numbers of the third lens L3 and the fifth lens L5 are larger than the upper limit of above-described [Equation 1] and [Equation 2], the high Abbe's numbers may be advantageous in chromatic aberration correction but may cause difficulty in reducing a size due to relatively low refractive index among plastic lenses.

Furthermore, the above-described lens assembly 100 may satisfy [Equation 3] below.

$$50 \leq V_{d1} \leq 60 \qquad \text{[Equation 3]}$$

$V_{d1}$ of [Equation 3] may indicate an Abbe's number of the first lens L1. [Equation 3] is an equation limited to the Abbe's number of the first lens L1 closest to the object side O. When the first lens L1 is made of a material having a value below the lower limit of above-described [Equation 3], difference in refractive index for each wavelength in the visible light region coming from the object side increases so that chromatic aberration correction is difficult, and when exceeding the upper limit of [Equation 3], it may be difficult to employ a plastic material such that manufacturing costs may increase, and difficult to reduce a weight of a product.

Furthermore, the above-described lens assembly 100 may satisfy [Equation 4] below.

$$16.5 \leq n_{d2} \leq 1.75 \qquad \text{[Equation 4]}$$

$n_{d2}$ of [Equation 4] may indicate a refractive index of the second lens L2. When the refractive index is below the lower limit of [Equation 4], the low refractive index of the second lens L2 may cause difficulty in reducing a size, and when the refractive exceeds the upper limit of [Equation 4], it may be difficult to employ a plastic material such that manufacturing costs may increase, and difficult to reduce a weight of a product.

Furthermore, the above-described lens assembly 100 may satisfy [Equation 5] below.

$$1.1 \leq \frac{Oal}{IH} \leq 1.4 \qquad \text{[Equation 5]}$$

Oal may indicate a distance from the surface S1, which faces the object side O, of the lens closest to the object side O, that is, the first lens L1 to the imaging plane of the image sensor 108, and IH may indicate the maximum height of the imaging plane img of the image sensor 108. When the lower limit of [Equation 5] is not satisfied, the overall length is small compared to the height of the imaging plane and thus it is advantageous for reducing a size but it is difficult to control aberration due to limitations in the number and shape of lenses, thereby causing difficulty in obtaining clear image when a high-pixel sensor is applied. When the upper limit is exceeded, the overall length becomes lager compared to the height of the imaging plane and thus a thickness of an electronic device may increase when the lens assembly is applied to a portable electronic device.

Furthermore, the above-described lens assembly 100 may satisfy [Equation 6] below.

$$0.14 \leq \frac{Bfl}{IH} \leq 0.25 \qquad \text{[Equation 6]}$$

Bfl may indicate a distance from the surface S13, which faces the image side I, of the lens closest to the image side I, that is, the sixth lens L6 to the imaging plane img of the image sensor 108, and IH may indicate the maximum height of the imaging plane img of the image sensor 108. When the lower limit is not satisfied in [Equation 6], a distance between a lens and a sensor becomes shorter, and therefore, it may cause insufficiency in an assemble space of the image sensor 108 and an assemble space of the filter 107 and insufficiency in a focus adjustment margin due to a focus error of each lens may cause a number of focusing defects during manufacturing. When the upper limit is exceeded in [Equation 6], the overall length of the whole optical system to cause difficulty in reducing a size.

[Table 1] below shows various lens data of the lens assembly 100 "S1-S4, and S6-S15" may be referred to as related multiple lenses (e.g., L1, L2, L3, L4, L5, and L6) and/or the filter 107. In addition, "y radius" may represent a radius of curvature of a lens, "Thickness" may represent a thickness or an air gap of a lens, "Nd" may represent a refractive index of a medium (e.g., a lens), and "Vd" may represent an Abbe's number of a lens. The lens assembly 100 included in [Table 1] may satisfy the above-described requirements (and/or at least one of the above-described requirements) by having an F-number Fno of about 1.88, an angle of view of about 85.1 degrees, and a focal distance of about 5.074 mm while an image height imgH of the image sensor is 4.8.

TABLE 1

| Surface | Surface type | y Radius | Thickness | Nd | Vd |
|---|---|---|---|---|---|
| S0 | Sphere | infinity | infinity | | |
| S1 | Odd Polynomial | 1.93643 | 0.76805 | 1.54401 | 55.91 |
| S2 | Odd Polynomial | 8.89743 | 0.09432 | | |
| S3 | Odd Polynomial | 10.80530 | 0.24063 | 1.67074 | 19.23 |
| S4 | Odd Polynomial | 4.48264 | 0.22167 | | |
| Stop | Sphere | infinity | 0.15311 | | |
| S6 | Odd Polynomial | 39.64757 | 0.44848 | 1.56717 | 37.4 |
| S7 | Odd Polynomial | −14.39092 | 0.44464 | | |
| S8 | Odd Polynomial | −9.41489 | 0.29749 | 1.63915 | 23.51 |
| S9 | Odd Polynomial | 29.61989 | 0.29922 | | |
| S10 | Odd Polynomial | 4.64957 | 0.60932 | 1.56717 | 37.4 |
| S11 | Odd Polynomial | −12.56001 | 0.51367 | | |
| S12 | Odd Polynomial | 6.57348 | 0.73660 | 1.53500 | 55.75 |
| S13 | Odd Polynomial | 1.82221 | 0.21381 | | |
| S14 | Sphere | infinity | 0.11000 | 1.51680 | 64.2 |
| S15 | Sphere | infinity | 0.75105 | | |
| img | Sphere | infinity | 0.018 | | |

According to an embodiment, in order to manufacture a small lens assembly, the first lens L1 closest to the object side O and the sixth lens L6 closest to the image side I may be required to be designed to have positive refractive power and negative refractive power, respectively, while having a low refractive index (e.g., 1.55 or less) with respect to a specific wavelength (e.g., 587.6000 nm) of the visible light. In addition, the second lens L2, which is closest to the first lens L1 from the object side may be required to be designed to have negative refractive power while having a high refractive index (e.g., 1.66 or less) with respect to a specific wavelength (e.g., 587.6000 nm) of the visible light. [Table 1] above shows lens data satisfying the design requirements described above. The first lens L1, which is a synthetic resin lens formed of a low-refractive material, may have positive power and a refractive index of 1.54401, the second lens L2, which is a synthetic resin lens formed of a high-refractive material, may have negative power and a refractive index of 1.67074, and the sixth lens L6, which is a synthetic resin lens formed of a low-refractive material, may have negative power and a refractive index of 1.53500. In response thereto, an Abbe's number of the first lens L1 may be configured to be 55.91, an Abbe's number of the second to 19.23, and an Abbe's number of the sixth lens L6 to be 55.75. In designing a lens assembly having six lenses, although the third lens L3, the fourth lens L4, and the fifth lens L5 which are arranged between the second lens L2 and the sixth lens L6 may have various lens data, the disclosure may provide the lens assembly 100 including the third lens L3, the fourth lens L4, and the fifth lens L5 capable of responding to a high-pixel image sensor and providing a compact optical system. For example, according to an embodiment of the disclosure, the third lens L3 which is a synthetic resin lens formed to have positive power and a refractive index between the first lens L1 and the second lens L2 may have a refractive index of 1.56717, and the Abbe's number thereof may be configured to be 37.4. Likewise, the fifth lens L5 which is a synthetic resin lens formed to have positive power and a refractive index between the first lens L1 and the second lens L2 may have a refractive index of 1.56717, and the Abbe's number thereof may be configured to be 37.4. The fourth lens L4 which is a synthetic resin lens formed to have negative power and a high refractive index compared to the first lens L3 and the fifth lens L5 may have a refractive index of 1.63915, and the Abbe's number thereof may be configured to be 23.51. By using the lens assembly 100 including the specification and satisfying [Equation 1], [Equation 2], and [Equation 3], an overall length of a whole optical system may be designed to a minimum, and when [Equation 5] and [Equation 6] are satisfied, an optical system corresponding to a high-pixel image sensor may be designed. In addition to [Table 1] above, a lens assembly according to various embodiments described in [Table 4], [Table 7], [Table 10], [Table 13], and [Table 16] below may be applied.

[Table 2] and [Table 3] show aspherical coefficients of the multiple lenses (e.g., L1, L2, L3, L4, L5, and L6), and the aspherical coefficients may be calculated through [Equation 7] below.

$$x = \frac{(y^2/R)}{1 + \sqrt{1 - (1+K)(y/R)^2}} + \sum_{i}(A_i)(y^i) \quad \text{[Equation 7]}$$

Here, "x" may represent a distance (sag) from an apex of a lens in an optical axis O-I direction, "R" may represent a radius of curvature, "y" may represent a distance in a direction perpendicular to the optical axis, "K" may represent a Conic constant, and "$A_i$" may represent an aspherical coefficient.

TABLE 2

| | S1 | S2 | S3 | S4 | S6 | S7 |
|---|---|---|---|---|---|---|
| K | −5.54683E−02 | −1.03319E+01 | −9.90000E+01 | −3.31565E+00 | 9.90000E+01 | −9.55303E+01 |
| $A_4$ | 1.69657E−03 | −1.68476E−02 | −3.92081E−02 | 1.98484E−02 | −4.99845E−02 | −4.55821E−02 |
| $A_6$ | −1.80113E−02 | −2.04977E−01 | 1.38644E−01 | −5.49583E−01 | 1.01792E−01 | −4.21862E−02 |
| $A_8$ | 9.16319E−02 | 1.98713E+00 | −9.25434E−01 | 6.64889E+00 | 5.28919E−02 | 6.26094E−01 |
| $A_{10}$ | −8.19369E−03 | −1.00208E+01 | 5.79059E+00 | −4.73569E+01 | −6.60817E+00 | −4.91394E+00 |
| $A_{12}$ | 1.27938E+00 | 3.21823E+01 | −2.40220E+01 | 2.25691E+02 | 5.07937E+01 | 2.33838E+01 |
| $A_{14}$ | 5.15379E+00 | −6.99821E+01 | 6.77754E+01 | −7.50880E+02 | −2.08963E+02 | −7.30482E+01 |
| $A_{16}$ | −1.08221E+01 | 1.06466E+02 | −1.34152E+02 | 1.78878E+03 | 5.52337E+02 | 1.55808E+02 |
| $A_{18}$ | 1.44294E+01 | −1.15255E+02 | 1.89478E+02 | −3.09149E+03 | −9.99766E+02 | −2.32300E+02 |
| $A_{20}$ | −1.29904E+01 | 8.91454E+01 | −1.91821E+02 | 3.88333E+03 | 1.26986E+03 | 2.44488E+02 |
| $A_{22}$ | 8.03144E+00 | −4.88186E+01 | 1.38042E+02 | 3.50876E+03 | −1.13357E+03 | −1.80885E+02 |
| $A_{24}$ | −3.37095E+00 | 1.84452E+01 | −6.88994E+01 | 2.22088E+03 | 6.97478E+02 | 9.20685E+01 |

TABLE 2-continued

| | S1 | S2 | S3 | S4 | S6 | S7 |
|---|---|---|---|---|---|---|
| $A_{26}$ | 9.19458E−01 | −4.56070E+00 | 2.26642E+01 | −9.34156E+02 | −2.81876E+02 | −3.07016E+01 |
| $A_{28}$ | −1.47177E−01 | 6.61827E−01 | 4.41762E+00 | 2.34409E+02 | 6.73757E+01 | 6.03966E+00 |
| $A_{30}$ | 1.04992E−02 | −4.25413E−02 | 3.86419E−01 | −2.65395E+01 | −7.22007E+00 | −5.31384E−01 |

TABLE 3

| | S8 | S9 | S10 | S11 | S12 | S13 |
|---|---|---|---|---|---|---|
| K | 1.71894E+01 | −5.35705E+01 | −1.54162E−01 | 1.69800E+01 | −1.13982E+00 | −1.01388E+00 |
| $A_4$ | −7.64630E−02 | −9.79004E−02 | 2.71160E−02 | 3.97076E−02 | −1.59399E−01 | −1.71063E−01 |
| $A_6$ | −2.53865E−01 | −1.38813E−01 | −1.02932E−01 | 2.04630E−02 | 8.29931E−02 | 9.20305E−02 |
| $A_8$ | 1.21866E+00 | 4.12473E−01 | 1.00961E−01 | −9.37527E−02 | −5.78548E−02 | −4.74078E−02 |
| $A_{10}$ | 3.16635E+00 | −5.98984E−01 | −7.78756E−02 | 1.14561E−01 | 3.69412E−02 | 1.94713E−02 |
| $A_{12}$ | 5.13663E+00 | 5.12199E−01 | 5.16433E−02 | −8.38578E−02 | −1.52045E−02 | −5.97305E−03 |
| $A_{14}$ | −4.86106E+00 | −1.75063E−01 | −3.02285E−02 | 4.21226E−02 | 4.05667E−03 | 1.35260E−03 |
| $A_{16}$ | 1.45947E+00 | −1.33968E−01 | 1.46773E−02 | −1.52655E−02 | −7.36297E−04 | −2.26465E−04 |
| $A_{18}$ | 2.60733E+00 | 2.19997E−01 | −5.51636E−03 | 4.06160E−03 | 9.39376E−05 | 2.80332E−05 |
| $A_{20}$ | −4.22199E+00 | −1.46281E−01 | 1.52866E−03 | −7.93254E−04 | −8.54838E−06 | −2.54918E−06 |
| $A_{22}$ | 3.17399E+00 | 5.84568E−02 | −3.01008E−04 | 1.12169E−04 | 5.53614E−07 | 1.67620E−07 |
| $A_{24}$ | 1.44607E+00 | −1.49219E−02 | 4.05405E−05 | −1.11479E−05 | −2.49800E−08 | −7.73375E−09 |
| $A_{26}$ | 4.07754E−01 | 2.38948E−03 | −3.53129E−06 | 7.36840E−07 | 7.47538E−10 | 2.36964E−10 |
| $A_{28}$ | −6.58367E−02 | −2.19383E−04 | 1.78747E−07 | −2.90253E−08 | −1.33493E−11 | −4.32238E−12 |
| $A_{30}$ | 4.67574E−03 | 8.82868E−06 | −3.98703E−09 | 5.14775E−10 | 1.07754E−13 | 3.54719E−14 |

Figure 2:
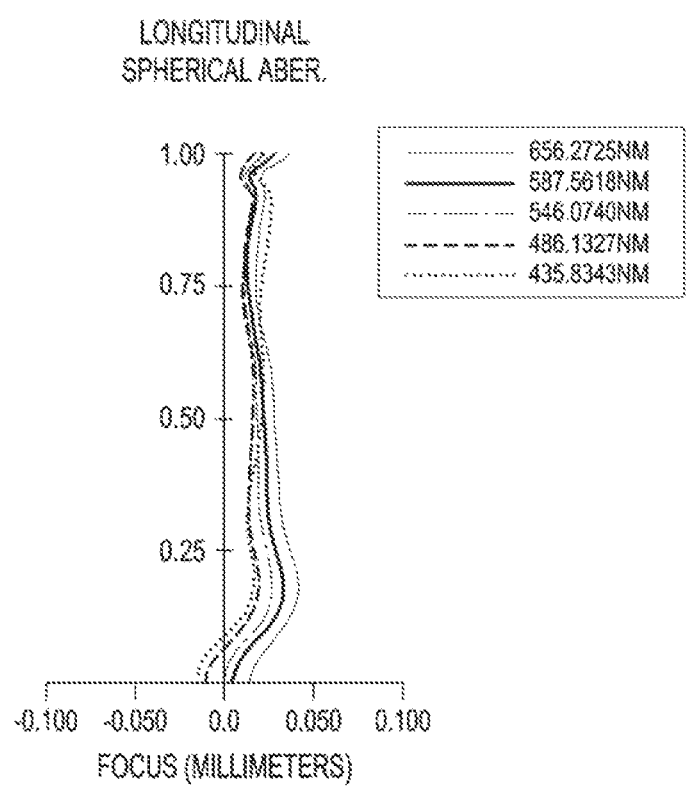
FIG. 2 is a graph illustrating a spherical aberration of the lens assembly in FIG. 1, according to an embodiment.

FIG. 2 is a graph illustrating a spherical aberration of the lens assembly 100 according to an embodiment (e.g., the embodiment of FIG. 1) of various embodiments of the disclosure. The spherical aberration may be a phenomenon in which focusing positions of lights passing through different portions (e.g., the chief portion and the marginal portion) of a lens change.

In FIG. 2, the horizontal axis represents a degree of a longitudinal spherical aberration, and the vertical axis represents a normalized distance from the center of an optical axis, thus showing changes of longitudinal spherical aberrations according to a wavelength of light. The longitudinal spherical aberrations may be represented for lights having wavelengths of, for example, about 656.2725 nm, about 587.5618 nm, about 546.0740 nm, about 486.1327 nm, or about 435.8343 nm, respectively. Referring to FIG. 2, the longitudinal spherical aberration of the lens assembly according to various embodiments of the disclosure in the visible light band is limited within +0.050 to −0.050 to show a stable optical characteristic.

Figure 3:
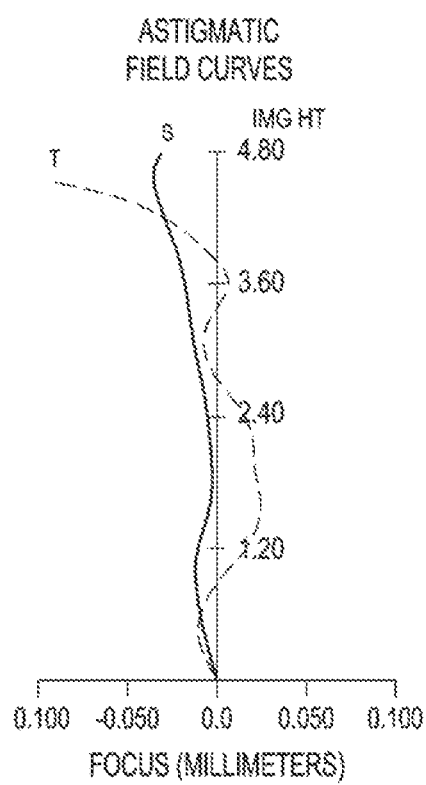
FIG. 3 is a graph illustrating an astigmatism of the lens assembly in FIG. 1, according to an embodiment.

FIG. 3 is a graph illustrating an astigmatism of the lens assembly 100 according to an embodiment (e.g., the embodiment of FIG. 1) of various embodiments of the disclosure. The astigmatism may represent that a focus of light passing through the vertical direction and the horizontal direction is out of focus when a tangential plane (or meridional plane) and a sagittal plane of a lens have different radii.

In FIG. 3, the astigmatism of the lens assembly 100 is a result obtained at a wavelength of 546.074 nm, the dot line represents an astigmatism T in a tangential direction (e.g., a tangential plane curvature), and the solid line represents an astigmatism S in a sagittal direction (e.g., a sagittal plane curvature). As identified through FIG. 3, it may be confirmed that the astigmatism according to various embodiments of the disclosure is generally limited within +0.050 to −0.050, and shows stable optical characteristics.

Figure 4:
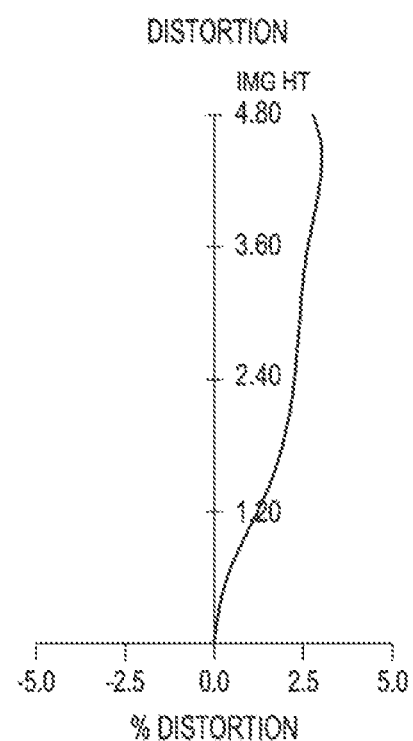
FIG. 4 is a graph illustrating a distortion of the lens assembly in FIG. 1, according to an embodiment.

FIG. 4 is a graph illustrating a distortion of the lens assembly 100 according to an embodiment (e.g., the embodiment of FIG. 1) of various embodiments of the disclosure. The distortion may be caused because an optical power changes according to a distance from the optical axis O-I and may represent that an image formed on an actual imaging plane (e.g., the imaging plane in FIG. 1) may appear large or small compared to an image formed on a theoretical imaging plane.

In FIG. 4, the distortion of the lens assembly 100 is a result obtained at a wavelength of 546.0740 nm, and an image photographed through the lens assembly may have some distortion occurring at a point that deviates from the optical axis O-I. However, such distortion ordinarily occurs in an optical device that uses lenses. The lens assembly may provide a good optical characteristic with a distortion rate of less than 3%.

Figure 5:
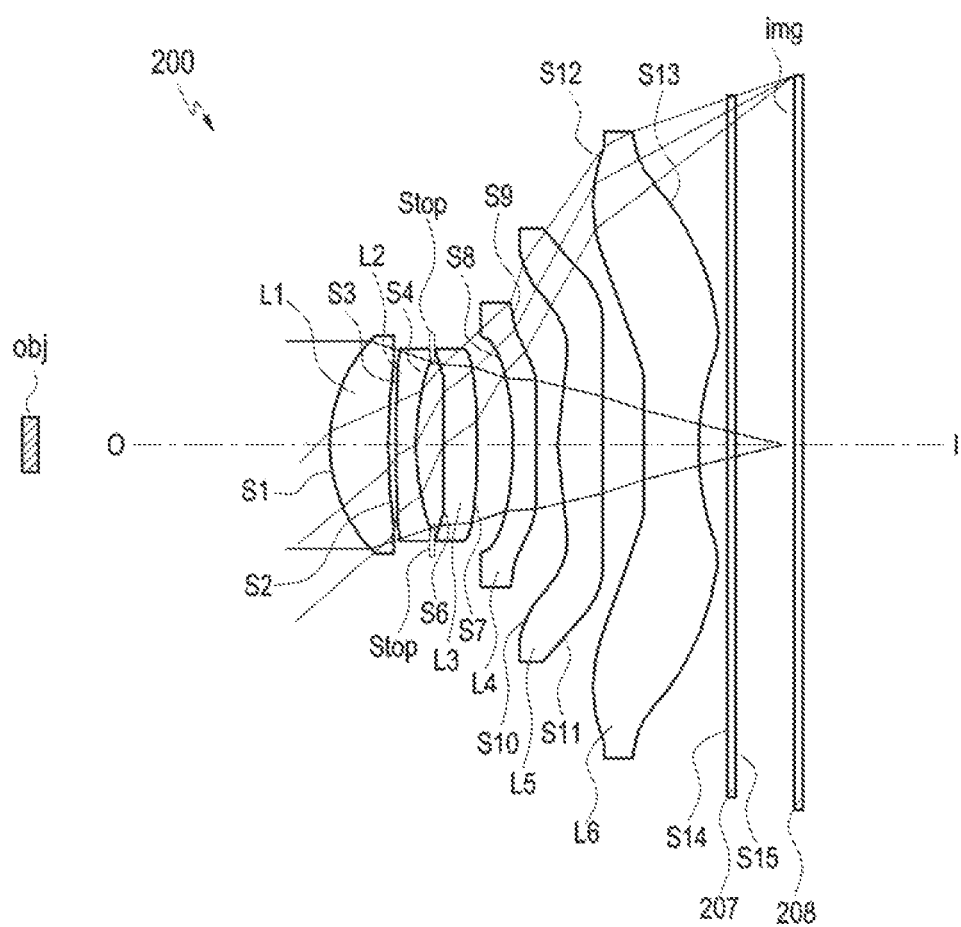
FIG. 5 is a diagram illustrating a lens assembly, according to an embodiment.
Figure 6:
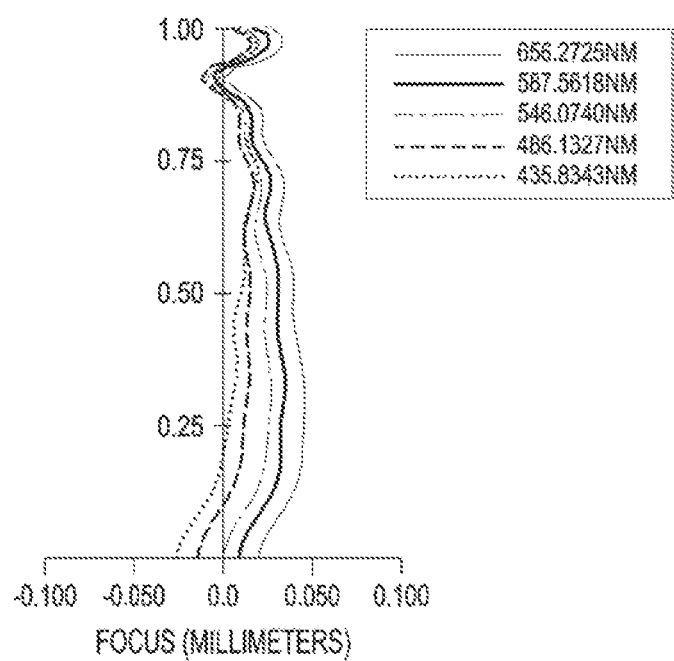
FIG. 6 is a graph illustrating a spherical aberration of the lens assembly in FIG. 5, according to an embodiment.
Figure 7:
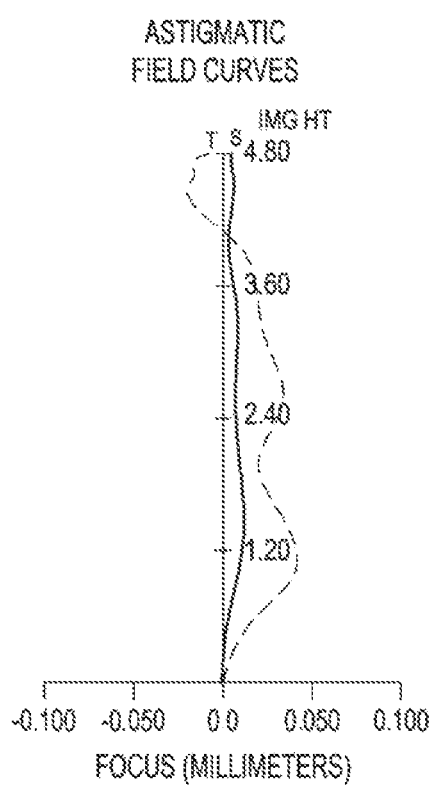
FIG. 7 is a graph illustrating an astigmatism of the lens assembly in FIG. 5, according to an embodiment.
Figure 8:
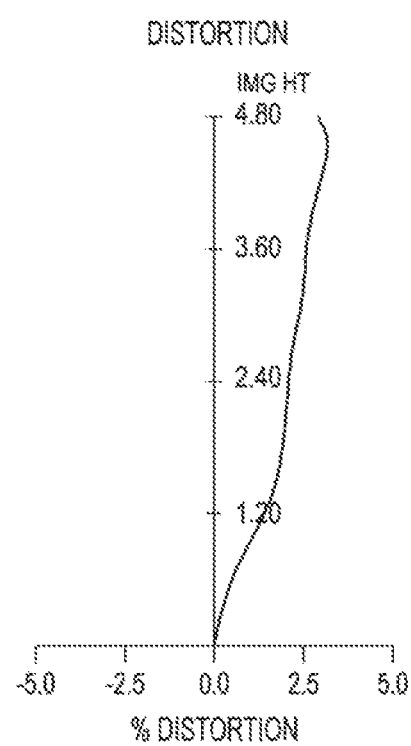
FIG. 8 is a graph illustrating a distortion of the lens assembly in FIG. 5, according to an embodiment.

FIG. 5 is a diagram illustrating a lens assembly 200, according to an embodiment. FIG. 6 is a graph illustrating a spherical aberration of the lens assembly 200, according to an embodiment. FIG. 7 is a graph illustrating an astigmatism of the lens assembly 200, according to an embodiment. FIG. 8 is a graph illustrating a distortion of the lens assembly 200, according to an embodiment.

The description of the lens assembly 100 may apply to lens assemblies 200, 300, 400, 500, 600 to be described below according to various embodiments. Some of the multiple lens assemblies 100, 200, 300, 400, 500, 600 may have a same attribute (e.g., an angle of view, a focal length, an auto focus, an F-number (F no), or an optical zoom), or at least one lens assembly may have one or more different lens attributes.

The multiple lens assemblies 100, 200, 300, 400, 500, 600 may include a flash (e.g., flash 2620 of FIG. 26 to be described below), an image sensor 108, 208, 308, 408, 508, 608, an image stabilizer (e.g., image stabilizer 2640 of FIG. 26 to be described below), a memory (e.g., memory 2650 of FIG. 26 to be described below), or an image signal processor (e.g., image signal processor 2660 of FIG. 26 to be described below) to constitute an optical device (e.g., a camera module).

In describing various embodiments of the disclosure below, the components described therein that may be easily understood through the configuration of the preceding embodiment may be denoted by the same reference numerals or the reference numerals may be omitted. In addition, the detailed descriptions thereof may also be omitted.

Referring to FIGS. 5-8, the lens assembly 200 may include multiple lenses (e.g., L1, L2, L3, L4, L5, and L6), an image sensor 208, and/or a filter 207.

[Table 4] below shows various lens data of the lens assembly 200 according to an embodiment. [Table 5] and [Table 6] each show aspherical coefficients of the multiple lenses (e.g., L1, L2, L3, L4, L5, and L6). The lens assembly 200 may satisfy the above-described requirements (and/or at least one of the above-described requirements) by having an F-number Fno of about 1.88, an angle or view of about 83.4 degrees, and a focal distance of about 5.220 mm.

TABLE 4

| Surface | Surface type | y Radius | Thickness | Nd | Vd |
|---|---|---|---|---|---|
| S0 | Sphere | infinity | infinity | | |
| S1 | Odd Polynomial | 1.925292 | 0.769629 | 1.54401 | 55.91 |
| S2 | Odd Polynomial | 7.418275 | 0.170255 | | |
| S3 | Odd Polynomial | 16.87605 | 0.261696 | 1.67074 | 19.23 |
| S4 | Odd Polynomial | 5.51676 | 0.213078 | | |
| Stop | Sphere | infinity | 0.144518 | | |
| S6 | Odd Polynomial | 15.10418 | 0.330905 | 1.56717 | 37.4 |
| S7 | Odd Polynomial | 79.17375 | 0.393221 | | |
| S8 | Odd Polynomial | −18.6959 | 0.340864 | 1.63491 | 23.97 |
| S9 | Odd Polynomial | 35.18458 | 0.411888 | | |
| S10 | Odd Polynomial | 4.779808 | 0.613938 | 1.56717 | 37.4 |
| S11 | Odd Polynomial | −12.5734 | 0.540794 | | |
| S12 | Odd Polynomial | 7.61824 | 0.59534 | 1.53500 | 55.75 |
| S13 | Odd Polynomial | 1.91331 | 0.318874 | | |
| S14 | Sphere | infinity | 0.11 | 1.51680 | 64.2 |
| S15 | Sphere | infinity | 0.742538 | | |
| img | Sphere | infinity | 0.015 | | |

TABLE 5

| | S1 | S2 | S3 | S4 | S6 | S7 |
|---|---|---|---|---|---|---|
| K | −5.80605E−02 | −8.65824E+00 | −1.15942E+02 | −9.02658E−01 | −7.04539E+01 | 4.89964E+01 |
| $A_4$ | −6.57793E−03 | −1.47093E−02 | −2.65914E−02 | 2.90203E−03 | −3.98547E−02 | −1.49361E−02 |
| $A_6$ | 6.46720E−02 | −2.55830E−02 | 1.04936E−01 | −2.60367E−01 | −1.23561E−02 | −4.65865E−01 |
| $A_8$ | −3.51126E−01 | 3.48005E−01 | −8.48427E−01 | 4.73546E+00 | −1.76021E−01 | 3.61398E+00 |
| $A_{10}$ | 1.26131E+00 | −2.07247E+00 | 5.97909E+00 | −4.26435E+01 | 2.75087E+00 | −1.76641E+01 |
| $A_{12}$ | −3.03223E+00 | 7.51752E+00 | −2.80523E+01 | 2.38165E+02 | −1.81749E+01 | 5.83712E+01 |
| $A_{14}$ | 5.01531E+00 | −1.80655E+01 | 8.98806E+01 | −8.81287E+02 | 7.09450E+01 | −1.36082E+02 |
| $A_{16}$ | −5.83561E+00 | 3.00686E+01 | −2.01053E+02 | 2.24845E+03 | −1.82355E+02 | 2.28743E+02 |
| $A_{18}$ | 4.83284E+00 | −3.54918E+01 | 3.18095E+02 | −4.04444E+03 | 3.22978E+02 | −2.79970E+02 |
| $A_{20}$ | −2.84912E+00 | 2.99502E+01 | −3.57238E+02 | 5.17103E+03 | −4.01216E+02 | 2.49396E+02 |
| $A_{22}$ | 1.17963E+00 | −1.79553E+01 | 2.82564E+02 | 4.67242E+03 | 3.49160E+02 | 1.59792E+02 |
| $A_{24}$ | −3.32152E−01 | 7.46919E+00 | −1.53723E+02 | 2.91610E+03 | −2.08558E+02 | 7.16596E+01 |
| $A_{26}$ | 5.97021E−02 | 2.04966E+00 | 5.47119E+01 | −1.19584E+03 | 8.14550E+01 | −2.13299E+01 |
| $A_{28}$ | −6.02378E−03 | 3.33642E−01 | −1.14639E+01 | 2.89910E+02 | −1.87322E+01 | 3.78257E+00 |
| $A_{30}$ | 2.46335E−04 | −2.43980E−02 | 1.07184E+00 | −3.14817E+01 | 1.92307E+00 | −3.02248E−01 |

TABLE 6

| | S8 | S9 | S10 | S11 | S12 | S13 |
|---|---|---|---|---|---|---|
| K | −2.73658E+01 | 9.90000E+01 | −5.91542E−01 | 1.71591E+01 | −8.36296E−01 | −9.80524E−01 |
| $A_4$ | −7.51787E−02 | −1.06166E−01 | −4.38753E−03 | 2.85837E−02 | −1.62232E−01 | −1.73925E−01 |
| $A_6$ | −2.21746E−01 | −2.96149E−02 | −2.40527E−02 | 2.11714E−02 | 8.62011E−02 | 8.98491E−02 |
| $A_8$ | 1.25142E+00 | 1.01730E−01 | −1.00420E−02 | −8.36596E−02 | −6.12302E−02 | −4.46536E−02 |
| $A_{10}$ | 4.04664E+00 | 1.48551E−02 | 2.61121E−02 | 1.00983E−01 | 3.95715E−02 | 1.80276E−02 |
| $A_{12}$ | 9.00086E+00 | −4.06648E−01 | −1.62384E−02 | −7.50768E−02 | −1.64733E−02 | −5.50081E−03 |
| $A_{14}$ | 1.43167E+01 | 8.52079E−01 | 9.03467E−05 | 3.89112E−02 | 4.44902E−03 | 1.25273E−03 |
| $A_{16}$ | 1.65555E+01 | −9.79761E−01 | 5.98496E−03 | −1.46483E−02 | −8.18153E−04 | −2.13421E−04 |
| $A_{18}$ | 1.40124E+01 | 7.28519E−01 | −4.24144E−03 | 4.04886E−03 | 1.05856E−04 | 2.71891E−05 |
| $A_{20}$ | 8.65749E+00 | −3.67433E−01 | 1.59379E−03 | −8.18607E−04 | −9.77843E−06 | −2.56999E−06 |
| $A_{22}$ | 3.84866E+00 | 1.26990E−01 | −3.74094E−04 | 1.19227E−04 | 6.43477E−07 | 1.77080E−07 |
| $A_{24}$ | 1.19378E+00 | −2.96481E−02 | 5.64879E−05 | −1.21381E−05 | −2.95326E−08 | −8.61445E−09 |
| $A_{26}$ | −2.43927E−01 | 4.47334E−03 | −5.34621E−06 | 8.17327E−07 | 8.99861E−10 | 2.79551E−10 |
| $A_{28}$ | 2.92989E−02 | −3.94063E−04 | 2.89232E−07 | −3.26212E−08 | −1.63790E−11 | −5.41744E−12 |
| $A_{30}$ | −1.55125E−03 | 1.54038E−05 | −6.83672E−09 | 5.83038E−10 | 1.34896E−13 | 4.73306E−14 |

Figure 9:
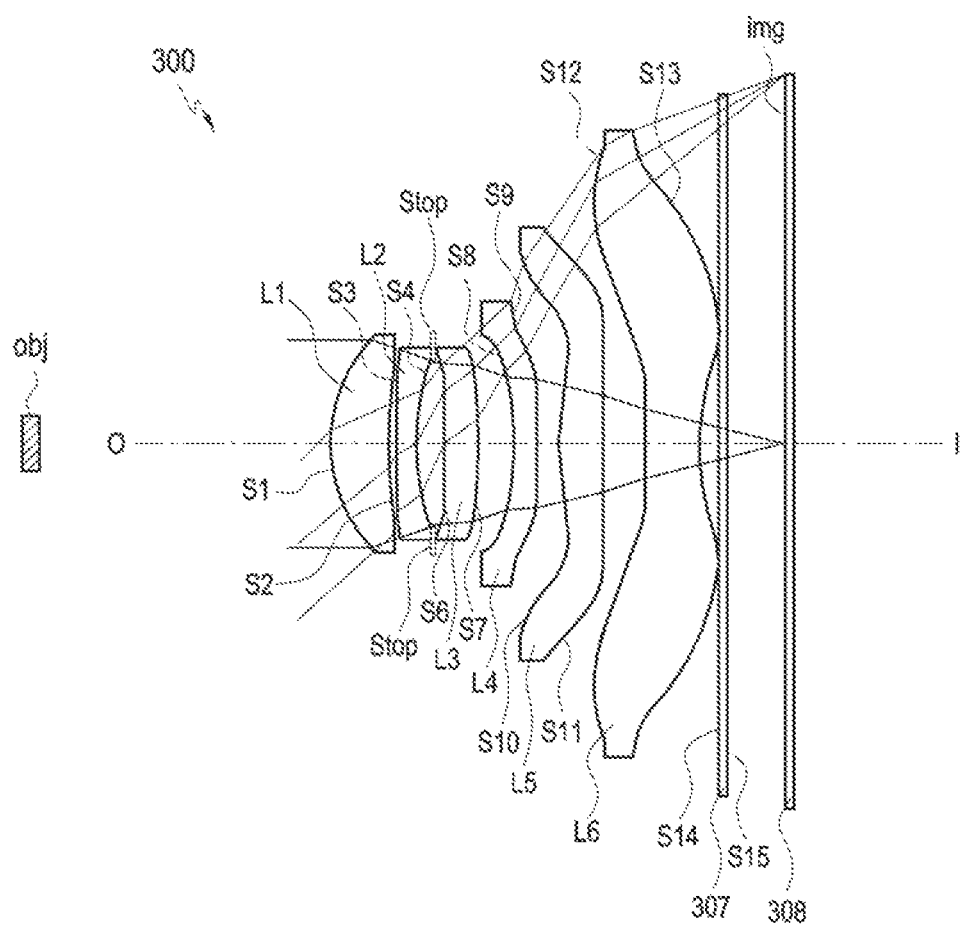
FIG. 9 is a diagram illustrating a lens assembly according to an embodiment.
Figure 10:
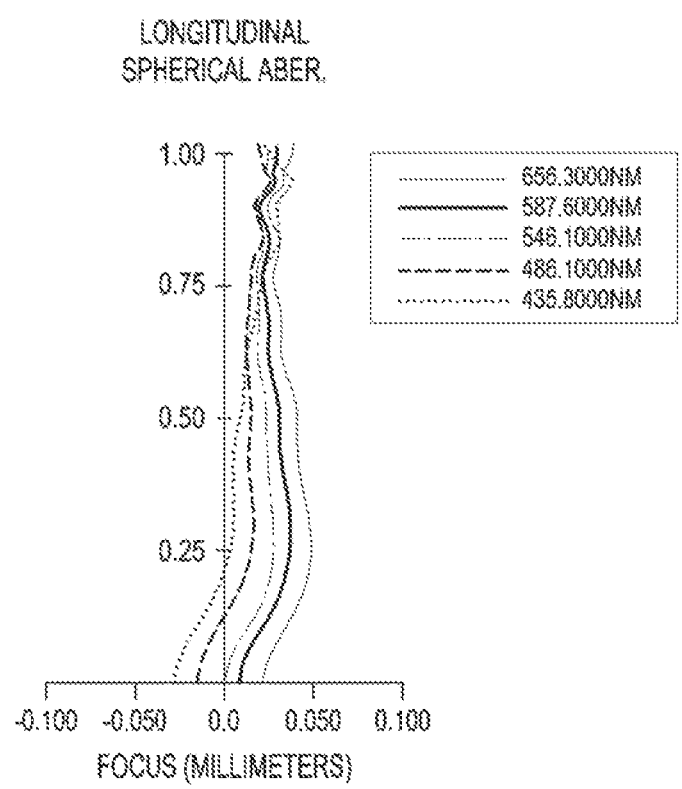
FIG. 10 is a graph illustrating a spherical aberration of the lens assembly in FIG. 9, according to an embodiment.
Figure 11:
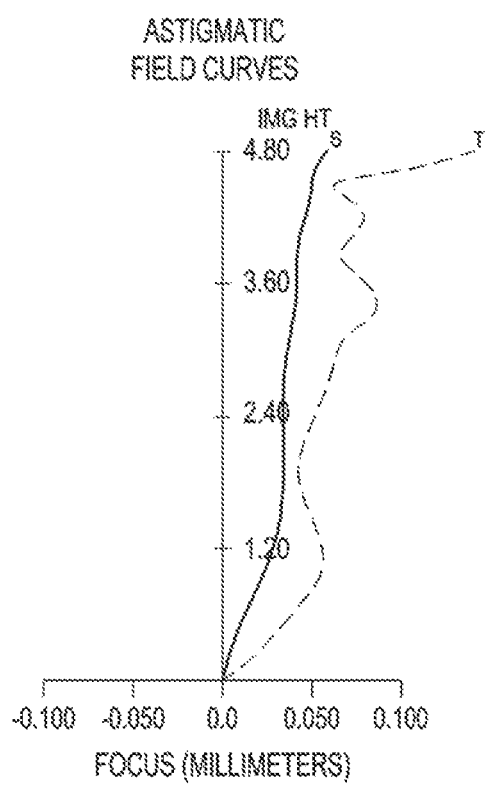
FIG. 11 is a graph illustrating an astigmatism of the lens assembly in FIG. 9, according to an embodiment.
Figure 12:
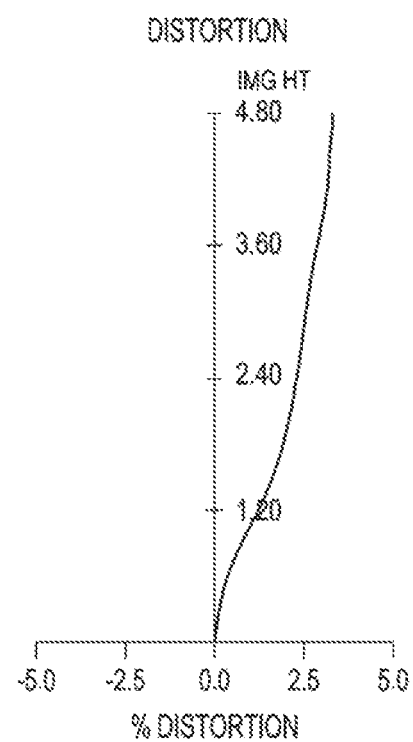
FIG. 12 is a graph illustrating a distortion of the lens assembly in FIG. 9, according to an embodiment.

FIG. 9 is a diagram illustrating a lens assembly 300, according to an embodiment. FIG. 10 is a graph illustrating a spherical aberration of the lens assembly 300, according to an embodiment. FIG. 11 is a graph illustrating an astigmatism of the lens assembly 300, according to an embodiment. FIG. 12 is a graph illustrating a distortion of the lens assembly 300, according to an embodiment.

Referring to FIGS. 9-12, the lens assembly 300 may include multiple lenses (e.g., L1, L2, L3, L4, L5, and L6), an image sensor 308, and/or a filter 307.

[Table 4] below shows various lens data of the lens assembly 300, and [Table 8] and [Table 9] each show aspherical coefficients of the multiple lenses (e.g., L1, L2, L3, L4, L5, and L6). The lens assembly 300 may satisfy the above-described requirements (and/or at least one of the above-described requirements) by having an F-number Fno of about 1.88, an angle or view of about 85 degrees, and a focal distance of about 5.059 mm.

TABLE 7

| Surface | Surface type | y Radius | Thickness | Nd | Vd |
|---|---|---|---|---|---|
| S0 | Sphere | infinity | infinity | | |
| S1 | Odd Polynomial | 1.86510 | 0.77998 | 1.54401 | 55.91 |
| S2 | Odd Polynomial | 6.47641 | 0.12848 | | |
| S3 | Odd Polynomial | 21.89660 | 0.25115 | 1.67073 | 19.23 |
| S4 | Odd Polynomial | 6.59365 | 0.21078 | | |
| Stop | Sphere | infinity | 0.14222 | | |
| S6 | Odd Polynomial | 16.48938 | 0.34865 | 1.56592 | 37.51 |
| S7 | Odd Polynomial | 87.78618 | 0.39580 | | |
| S8 | Odd Polynomial | −14.37099 | 0.31859 | 1.64168 | 23.03 |
| S9 | Odd Polynomial | −1225.57464 | 0.40897 | | |
| S10 | Odd Polynomial | 4.77686 | 0.56130 | 1.55505 | 42.48 |
| S11 | Odd Polynomial | −16.56189 | 0.56480 | | |
| S12 | Odd Polynomial | 7.46913 | 0.64669 | 1.53500 | 55.75 |
| S13 | Odd Polynomial | 1.81972 | 0.18959 | | |
| S14 | Sphere | infinity | 0.11000 | 1.51680 | 64.2 |
| S15 | Sphere | infinity | 0.73907 | | |
| img | Sphere | infinity | 0.018 | | |

TABLE 8

| | S1 | S2 | S3 | S4 | S6 | S7 |
|---|---|---|---|---|---|---|
| K | −4.37200E−02 | −1.28652E+01 | −9.90000E+01 | −6.71414E−02 | −8.82591E+01 | −9.90000E+01 |
| $A_4$ | −9.77356E−03 | −2.09145E−02 | −4.31803E−03 | 6.87643E−03 | −5.06884E−02 | −1.28993E−02 |
| $A_6$ | 1.25690E−01 | 6.77599E−02 | −3.72910E−01 | −3.50214E−01 | −3.78851E−02 | −6.17097E−01 |
| $A_8$ | −8.54448E−01 | −8.98696E−01 | 3.27817E+00 | 5.01891E+00 | 1.17764E+00 | 5.33414E+00 |
| $A_{10}$ | 3.75550E+00 | 6.77374E+00 | −1.67323E+01 | −3.92920E+01 | −1.20223E+01 | 2.93788E+01 |
| $A_{12}$ | −1.10008E+01 | −3.04269E+01 | 5.78659E+01 | 2.00632E+02 | 6.82728E+01 | 1.09332E+02 |
| $A_{14}$ | 2.22519E+01 | 8.83096E+01 | −1.41124E+02 | −7.00464E+02 | −2.50310E+02 | 2.85255E+02 |
| $A_{16}$ | 3.18641E+01 | −1.73658E+02 | 2.48252E+02 | 1.72091E+03 | 6.30585E+02 | 5.32393E+02 |
| $A_{18}$ | 3.27530E+01 | 2.37623E+02 | −3.18459E+02 | 3.02202E+03 | −1.12474E+03 | 7.17763E+02 |
| $A_{20}$ | −2.42406E+01 | −2.28767E+02 | 2.97881E+02 | 3.80820E+03 | 1.43509E+03 | 6.99098E+02 |
| $A_{22}$ | 1.28019E+01 | 1.54392E+02 | −2.00694E+02 | −3.41453E+03 | −1.30226E+03 | 4.86578E+02 |
| $A_{24}$ | −4.70511E+00 | −7.15024E+01 | 9.46717E+01 | 2.12508E+03 | 8.20652E+02 | 2.35718E+02 |
| $A_{26}$ | 1.14315E+00 | 2.16433E+01 | −2.96063E+01 | −8.72178E+02 | −3.41255E+02 | −7.54365E+01 |
| $A_{28}$ | −1.65022E−01 | −3.85620E+00 | 5.49980E+00 | 2.12195E+02 | 8.41558E+01 | 1.43264E+01 |
| $A_{30}$ | 1.07169E−02 | 3.06655E−01 | −4.58112E−01 | −2.31722E+01 | −9.31623E+00 | −1.22193E+00 |

TABLE 9

| | S8 | S9 | S10 | S11 | S12 | S13 |
|---|---|---|---|---|---|---|
| K | 8.16819E+01 | 1.01388E+01 | −3.77400E−01 | 1.59819E+01 | −8.33214E−01 | −1.01563E+00 |
| $A_4$ | −1.27176E−01 | −1.21640E−01 | 1.53161E−02 | 3.98266E−02 | −1.70252E−01 | −1.88678E−01 |
| $A_6$ | 3.04570E−01 | 5.45462E−02 | −5.60563E−02 | 9.25098E−03 | 9.15415E−02 | 1.10408E−01 |
| $A_8$ | −2.39099E+00 | −3.45646E−01 | 1.67478E−02 | −7.81701E−02 | −6.52844E−02 | −6.25630E−02 |
| $A_{10}$ | 1.16379E+01 | 1.34702E+00 | 2.52606E−02 | 1.04248E−01 | 4.27695E−02 | 2.82092E−02 |
| $A_{12}$ | −3.66384E+01 | −3.02960E+00 | −4.03553E−02 | −8.20640E−02 | −1.81254E−02 | −9.47440E−03 |
| $A_{14}$ | 7.90661E+01 | 4.45472E+00 | 2.84836E−02 | 4.40452E−02 | 4.98725E−03 | 2.34686E−03 |
| $A_{16}$ | −1.20939E+02 | −4.50932E+00 | −1.20319E−02 | −1.69073E−02 | −9.34417E−04 | −4.29402E−04 |
| $A_{18}$ | 1.33338E+02 | 3.21453E+00 | 3.17915E−03 | 4.72244E−03 | 1.23165E−04 | 5.79828E−05 |
| $A_{20}$ | −1.06397E+02 | −1.62302E+00 | −4.96581E−04 | −9.61284E−04 | −1.15895E−05 | −5.73760E−06 |
| $A_{22}$ | 6.09230E+01 | 5.76048E−01 | 3.29181E−05 | 1.40963E−04 | 7.76858E−07 | 4.09467E−07 |
| $A_{24}$ | −2.44169E+01 | −1.40401E−01 | 2.56328E−06 | −1.44827E−05 | −3.63204E−08 | −2.04552E−08 |
| $A_{26}$ | 6.50600E+00 | 2.23663E−02 | −7.03529E−07 | 9.87738E−07 | 1.12756E−09 | 6.77268E−10 |
| $A_{28}$ | −1.03570E+00 | −2.09737E−03 | 5.49431E−08 | −4.01032E−08 | −2.09168E−11 | −1.33300E−11 |
| $A_{30}$ | 7.45612E−02 | 8.78195E−05 | −1.57615E−09 | 7.32564E−10 | 1.75643E−13 | 1.17924E−13 |

Figure 13:
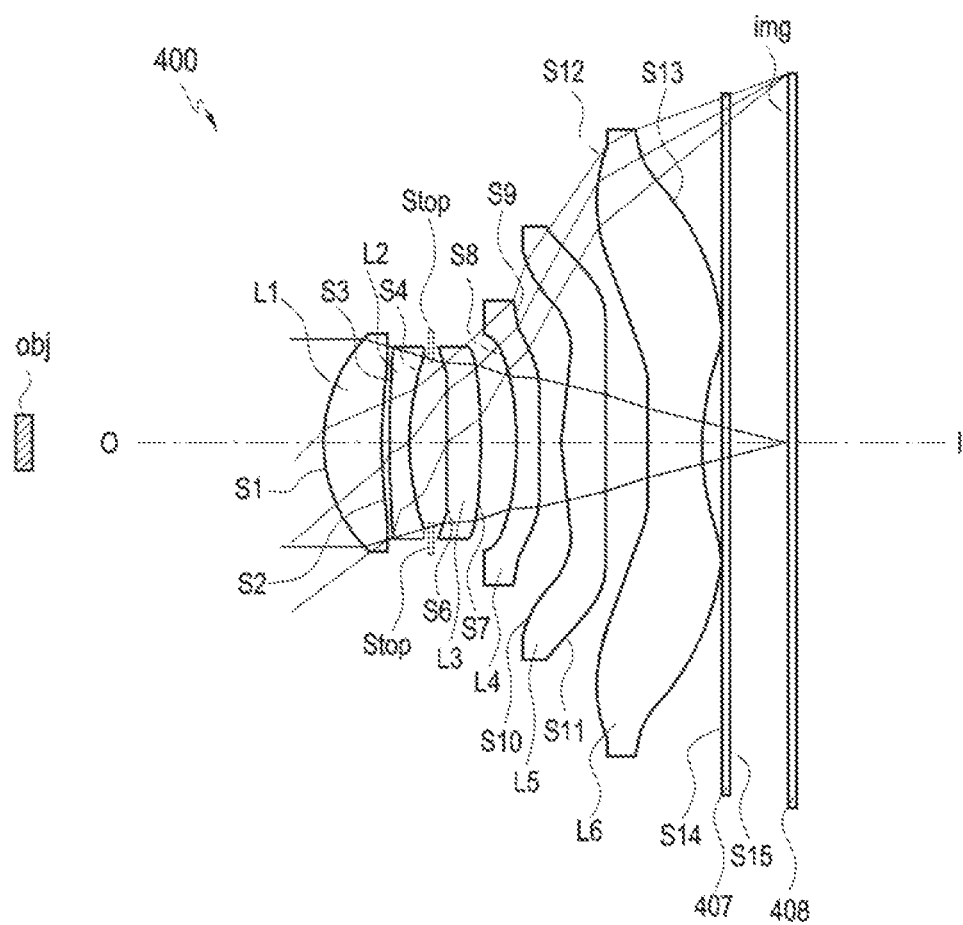
FIG. 13 is a diagram illustrating a lens assembly according to an embodiment.
Figure 14:
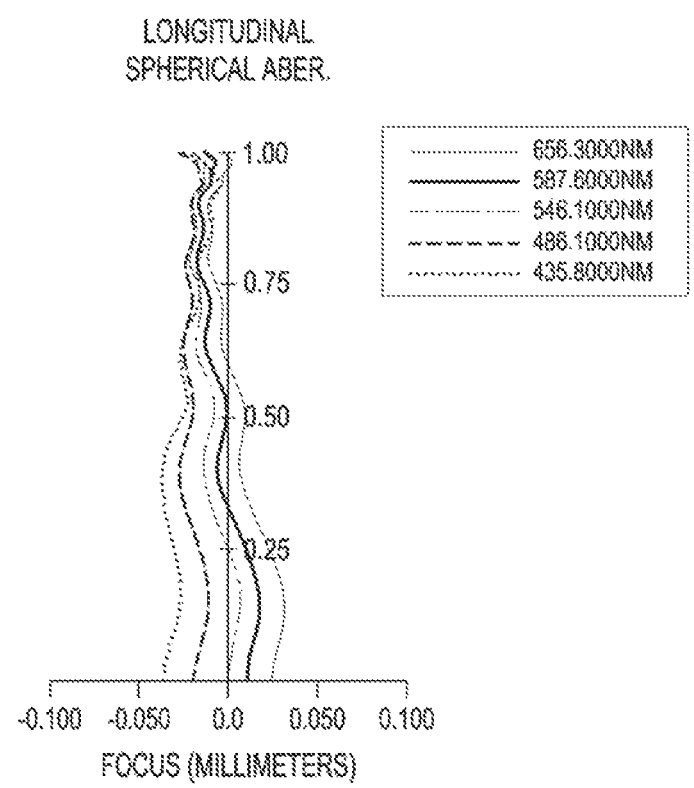
FIG. 14 is a graph illustrating a spherical aberration of the lens assembly in FIG. 13, according to an embodiment.
Figure 15:
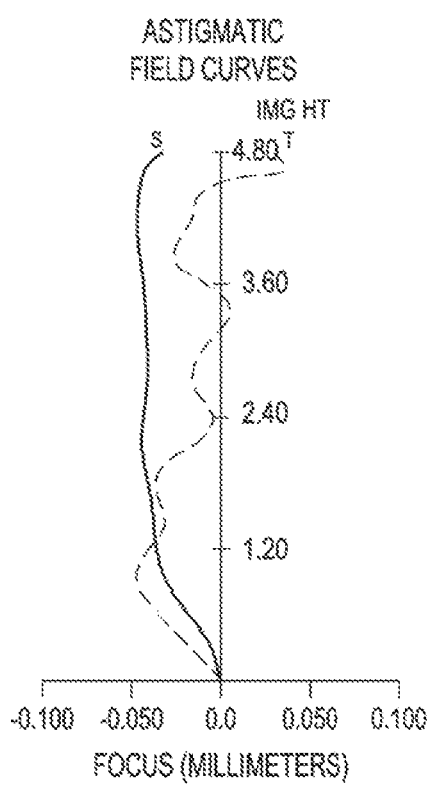
FIG. 15 is a graph illustrating an astigmatism of the lens assembly in FIG. 13, according to an embodiment.
Figure 16:
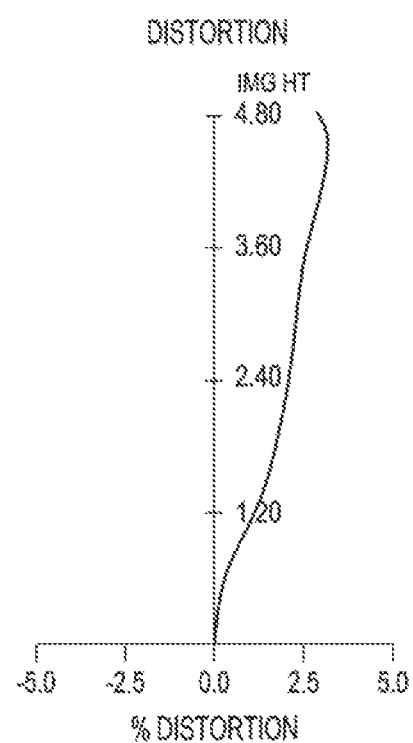
FIG. 16 is a graph illustrating a distortion of the lens assembly in FIG. 13, according to an embodiment.

FIG. 13 is a diagram illustrating a lens assembly 400, according to an embodiment. FIG. 14 is a graph illustrating a spherical aberration of the lens assembly 400, according to an embodiment. FIG. 15 is a graph illustrating an astigmatism of the lens assembly 400, according to an embodiment. FIG. 16 is a graph illustrating a distortion of the lens assembly 400, according to an embodiment.

Referring to FIGS. 13-16, the lens assembly 400 according to still another embodiment of various embodiments of the disclosure may include multiple lenses (e.g., L1, L2, L3, L4, L5, and L6), an image sensor 408, and/or a filter 407.

[Table 10] below shows various lens data of the lens assembly 400. [Table 11] and [Table 12] each show aspherical coefficients of the multiple lenses (e.g., L1, L2, L3, L4, L5, and L6). The lens assembly 400 may satisfy the above-described requirements (and/or at least one of the above-described requirements) by having an F-number Fno of 1.88, an angle or view of 85.7 degrees, and a focal distance of 5.043 mm.

TABLE 10

| Surface | Surface type | y Radius | Thickness | Nd | Vd |
|---|---|---|---|---|---|
| S0 | Sphere | infinity | infinity | | |
| S1 | Odd Polynomial | 1.86763 | 0.75473 | 1.54401 | 55.91 |
| S2 | Odd Polynomial | 5.97018 | 0.10434 | | |
| S3 | Odd Polynomial | 11.49615 | 0.26272 | 1.68039 | 18.14 |
| S4 | Odd Polynomial | 5.70807 | 0.22319 | | |
| Stop | Sphere | infinity | 0.15462 | | |
| S6 | Odd Polynomial | 15.13498 | 0.33750 | 1.56717 | 37.4 |
| S7 | Odd Polynomial | 59.64854 | 0.40902 | | |
| S8 | Odd Polynomial | −14.52503 | 0.31419 | 1.63914 | 23.51 |
| S9 | Odd Polynomial | 254.93401 | 0.39621 | | |
| S10 | Odd Polynomial | 4.81820 | 0.53684 | 1.56717 | 37.4 |
| S11 | Odd Polynomial | −16.33560 | 0.55214 | | |
| S12 | Odd Polynomial | 7.48335 | 0.61904 | 1.53500 | 55.75 |
| S13 | Odd Polynomial | 1.80221 | 0.18640 | | |
| S14 | Sphere | infinity | 0.11000 | 1.51680 | 64.2 |
| S15 | Sphere | infinity | 0.77485 | | |
| img | Sphere | infinity | −0.01798 | | |

TABLE 11

| | S1 | S2 | S3 | S4 | S6 | S7 |
|---|---|---|---|---|---|---|
| K | −5.73028E−02 | 1.28417E+01 | −8.84969E+01 | −8.22097E−01 | −3.81108E+01 | 7.91401E+01 |
| $A_4$ | 3.37884E−03 | −1.08680E−02 | −3.56888E−02 | 7.88431E−03 | −9.82275E−03 | −3.59347E−02 |
| $A_6$ | 4.00847E−04 | −7.33118E−02 | 1.73391E−01 | −2.17174E−01 | −5.80645E−01 | −3.14996E−01 |
| $A_8$ | −1.94435E−01 | −1.47784E−01 | −1.76646E+00 | 2.62550E+00 | 5.01968E+00 | 3.18963E+00 |
| $A_{10}$ | 1.67777E+00 | 4.72525E+00 | 1.24928E+01 | −1.95465E+01 | −2.67178E+01 | −1.99808E+01 |
| $A_{12}$ | −6.89295E+00 | −2.79313E+01 | 5.56900E+01 | 1.03860E+02 | 9.25247E+01 | 8.20338E+01 |
| $A_{14}$ | 1.70598E+01 | 8.98437E+01 | 1.66859E+02 | −3.89859E+02 | 2.16164E+02 | −2.30543E+02 |
| $A_{16}$ | −2.77944E+01 | 1.84950E+02 | −3.48967E+02 | 1.03339E+03 | 3.44997E+02 | 4.54940E+02 |
| $A_{18}$ | 3.10863E+01 | 2.58801E+02 | 5.19327E+02 | −1.94351E+03 | −3.72310E+02 | −6.39608E+02 |
| $A_{20}$ | 2.42927E+01 | 2.52132E+02 | 5.53011E+02 | 2.59674E+03 | 2.58742E+02 | 6.43169E+02 |
| $A_{22}$ | 1.32556E+01 | 1.71357E+02 | 4.18177E+02 | −2.44504E+03 | −9.81140E+01 | −4.58830E+02 |
| $A_{24}$ | −4.95065E+00 | 7.97413E+01 | 2.19201E+02 | 1.58482E+03 | 2.99626E+00 | 2.26648E+02 |
| $A_{26}$ | 1.20593E+00 | 2.42318E+01 | 7.57128E+01 | −6.72814E+02 | 1.48252E+01 | −7.36871E+01 |
| $A_{28}$ | −1.72552E−01 | −4.33337E+00 | 1.54972E+01 | 1.68381E+02 | −6.07853E+00 | 1.41797E+01 |
| $A_{30}$ | 1.09944E−02 | 3.45915E−01 | 1.42387E+00 | −1.88287E+01 | 8.14049E−01 | −1.22326E+00 |

TABLE 12

| | S8 | S9 | S10 | S11 | S12 | S13 |
|---|---|---|---|---|---|---|
| K | 9.89996E+01 | 2.98315E+01 | −3.22086E−01 | 1.90434E+01 | −1.20147E+00 | 1.01667E+00 |
| $A_4$ | −1.32306E−01 | −1.51449E−01 | 1.05802E−02 | 3.45474E−02 | −1.75437E−01 | −1.91966E−01 |
| $A_6$ | 5.12679E−01 | 2.98943E−01 | −4.60230E−02 | 4.03427E−02 | 9.55444E−02 | 1.07907E−01 |
| $A_8$ | −4.28834E+00 | 1.42072E+00 | 3.55785E−03 | −1.48771E−01 | −6.68884E−02 | −5.78672E−02 |
| $A_{10}$ | 2.11936E+01 | 4.29982E+00 | 3.37064E−02 | 1.94943E−01 | 4.32709E−02 | 2.51569E−02 |
| $A_{12}$ | −6.67436E+01 | −8.40835E+00 | −4.14009E−02 | −1.57379E−01 | −1.82636E−02 | −8.30953E−03 |
| $A_{14}$ | 1.42691E+02 | 1.12250E+01 | 2.56519E−02 | 8.68722E−02 | 5.01848E−03 | 2.05310E−03 |
| $A_{16}$ | −2.14932E+02 | −1.05549E+01 | −9.33479E−03 | −3.41057E−02 | −9.39728E−04 | −3.78324E−04 |
| $A_{18}$ | 2.32540E+02 | 7.09709E+00 | 1.85323E−03 | 9.67815E−03 | 1.23821E−04 | 5.17759E−05 |
| $A_{20}$ | −1.81733E+02 | 3.42040E+00 | −7.66251E−05 | −1.98993E−03 | −1.16480E−05 | −5.21309E−06 |
| $A_{22}$ | 1.01806E+02 | 1.17003E+00 | −5.69104E−05 | 2.93433E−04 | 7.80571E−07 | 3.79389E−07 |
| $A_{24}$ | −3.98950E+01 | −2.76980E−01 | 1.54764E−05 | −3.02219E−05 | −3.64856E−08 | −1.93478E−08 |
| $A_{26}$ | 1.03910E+01 | 4.31150E−02 | −1.89906E−06 | 2.06237E−06 | 1.13250E−09 | 6.54168E−10 |
| $A_{28}$ | −1.61685E+00 | −3.96867E−03 | 1.19321E−07 | −8.37086E−08 | −2.10070E−11 | −1.31463E−11 |
| $A_{30}$ | 1.13789E−01 | 1.63669E−04 | −3.10773E−09 | 1.52842E−09 | 1.76416E−13 | 1.18699E−13 |

Figure 17:
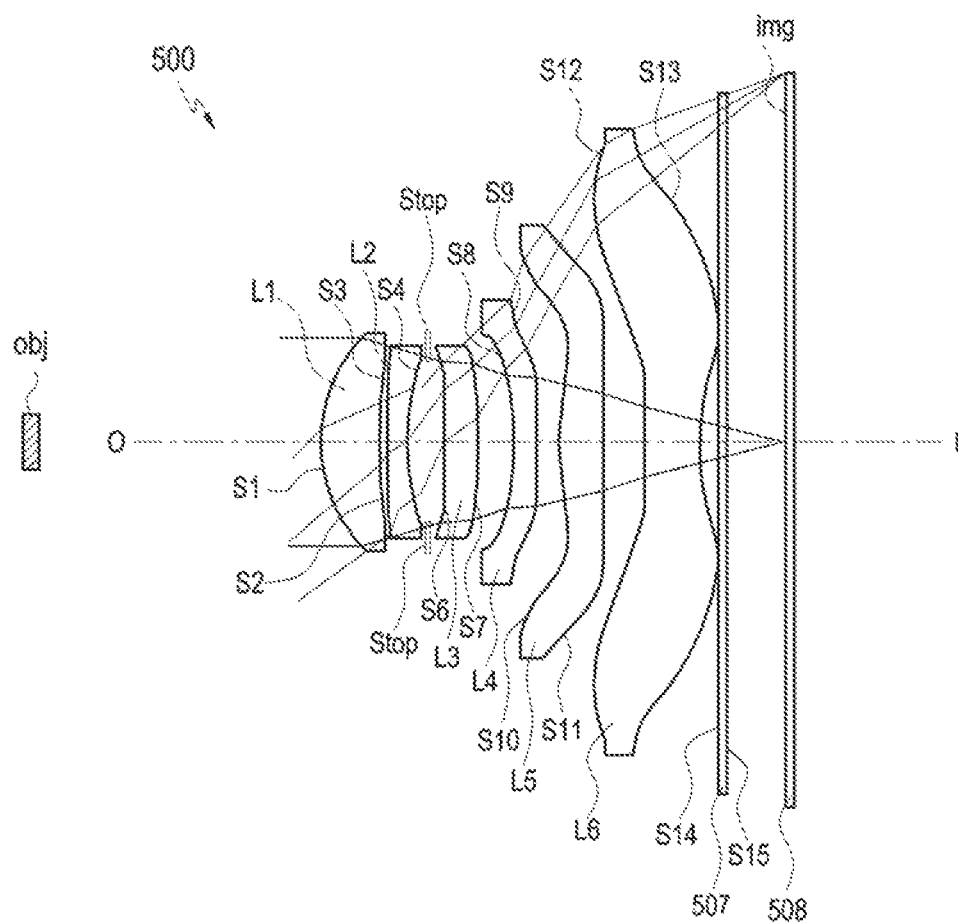
FIG. 17 is a diagram illustrating a lens assembly according to an embodiment.
Figure 18:
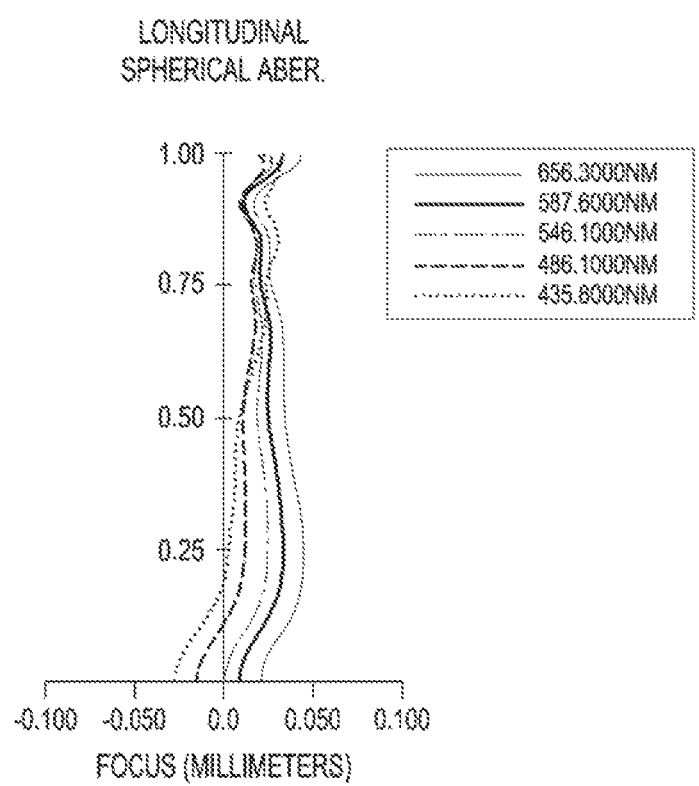
FIG. 18 is a graph illustrating a spherical aberration of the lens assembly in FIG. 17, according to an embodiment.
Figure 19:
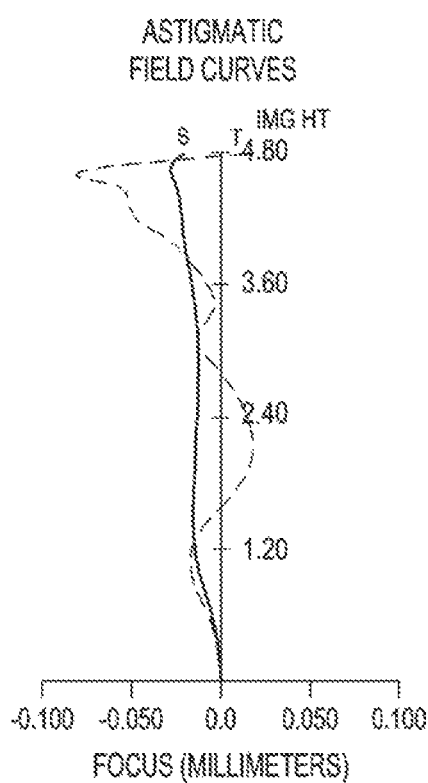
FIG. 19 is a graph illustrating an astigmatism of the lens assembly in FIG. 17, according to an embodiment.
Figure 20:
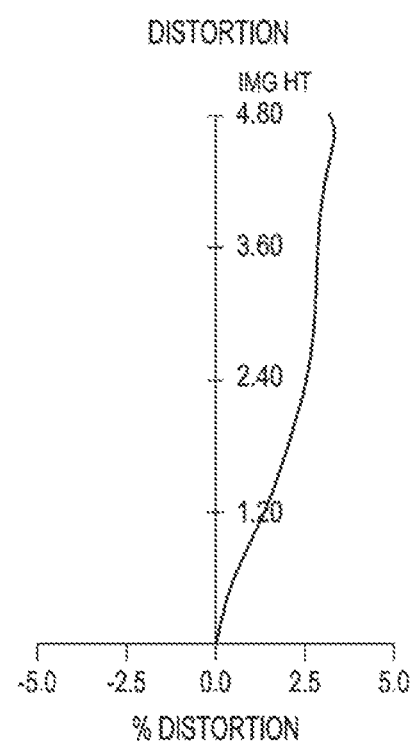
FIG. 20 is a graph illustrating a distortion of the lens assembly in FIG. 17, according to an embodiment.

FIG. 17 is a diagram illustrating a lens assembly 500 according to an embodiment. FIG. 18 is a graph illustrating a spherical aberration of the lens assembly 500 according to an embodiment. FIG. 19 is a graph illustrating an astigmatism of the lens assembly 500 according to an embodiment. FIG. 20 is a graph illustrating a distortion of the lens assembly 500 according to an embodiment.

Referring to FIGS. 17-20, the lens assembly 500 according to still another embodiment of various embodiments of the disclosure may include multiple lenses (e.g., L1, L2, L3, L4, L5, and L6), an image sensor 508, and/or a filter 507.

[Table 13] below shows various lens data of the lens assembly 500, and [Table 14] and [Table 15] each show aspherical coefficients of multiple lenses (e.g., L1, L2, L3, L4, L5, and L6). The lens assembly 500 may satisfy the above-described requirements (and/or at least one of the above-described requirements) by having an F-number Fno of about 1.87, an angle or view of about 85.2 degrees, and a focal distance of about 5.046 mm.

TABLE 13

| Surface | Surface type | y Radius | Thickness | Nd | Vd |
|---|---|---|---|---|---|
| S0 | Sphere | infinity | infinity | | |
| S1 | Odd Polynomial | 1.87456 | 0.78390 | 1.54401 | 55.91 |
| S2 | Odd Polynomial | 7.04030 | 0.13230 | | |
| S3 | Odd Polynomial | 15.60702 | 0.24873 | 1.68039 | 18.14 |
| S4 | Odd Polynomial | 5.61801 | 0.22023 | | |
| Stop | Sphere | infinity | 0.15170 | | |
| S6 | Odd Polynomial | 15.52237 | 0.34807 | 1.61442 | 25.96 |
| S7 | Odd Polynomial | 63.92531 | 0.42328 | | |
| S8 | Odd Polynomial | −14.30217 | 0.31168 | 1.63914 | 23.51 |
| S9 | Odd Polynomial | 416.07653 | 0.39848 | | |
| S10 | Odd Polynomial | 4.89699 | 0.55209 | 1.56717 | 37.4 |
| S11 | Odd Polynomial | −15.34444 | 0.54930 | | |
| S12 | Odd Polynomial | 7.27726 | 0.62012 | 1.53500 | 55.75 |
| S13 | Odd Polynomial | 1.80221 | 0.18533 | | |
| S14 | Sphere | infinity | 0.11000 | 1.51680 | 64.2 |
| S15 | Sphere | infinity | 0.73915 | | |
| img | Sphere | infinity | 0.018 | | |

TABLE 14

| | S1 | S2 | S3 | S4 | S6 | S7 |
|---|---|---|---|---|---|---|
| K | −4.61578E−02 | −1.22418E+01 | −7.74419E+01 | −3.02193E−01 | −7.18813E+01 | 9.90000E+01 |
| $A_4$ | 9.18884E−03 | −7.10707E−03 | −3.82435E−02 | 1.95082E−02 | −4.43088E−02 | −5.70684E−02 |
| $A_6$ | −6.28590E−02 | −1.90704E−01 | 8.78127E−01 | −5.20450E−01 | −1.33827E−01 | 3.11407E−02 |
| $A_8$ | 2.55526E−01 | 1.52563E+00 | −3.84134E−01 | 5.96131E+00 | 1.68165E+00 | −3.09606E−02 |
| $A_{10}$ | −4.22047E−01 | 7.12790E+00 | 2.12061E+00 | 4.15338E+01 | −1.20600E+01 | −1.14167E+00 |
| $A_{12}$ | −4.85649E−01 | 2.18302E+01 | −8.26369E+00 | 1.99162E+02 | 5.59102E+01 | 8.79318E+00 |
| $A_{14}$ | 3.97665E+00 | −4.57681E+01 | 2.27691E+01 | −6.76485E+02 | −1.79149E+02 | −3.38022E+01 |
| $A_{16}$ | −9.51052E+00 | 6.74450E+01 | −4.51577E+01 | 1.65534E+03 | 4.09615E+02 | 8.08192E+01 |
| $A_{18}$ | 1.33640E+01 | −7.08722E+01 | 6.47991E+01 | −2.94194E+03 | −6.78866E+02 | −1.29347E+02 |
| $A_{20}$ | 1.23651E+01 | 5.32653E+01 | −6.70234E+01 | 3.79391E+03 | 8.17904E+02 | 1.42709E+02 |
| $A_{22}$ | 7.76098E+00 | 2.83615E+01 | 4.93261E+01 | −3.50844E+03 | 7.09232E+02 | −1.09069E+02 |
| $A_{24}$ | −3.28060E+00 | 1.04240E+01 | −2.51450E+01 | 2.26440E+03 | 4.31079E+02 | 5.67716E+01 |
| $A_{26}$ | 8.95687E−01 | 2.50845E+00 | 8.42992E+00 | −9.67508E+02 | −1.74191E+02 | −1.92124E+01 |
| $A_{28}$ | −1.42788E−01 | 3.54480E−01 | −1.67093E+00 | 2.45725E+02 | 4.19969E+01 | 3.81154E+00 |
| $A_{30}$ | 1.01010E−02 | −2.22055E−02 | 1.48345E−01 | −2.80680E+01 | −4.56765E+00 | −3.36295E−01 |

TABLE 15

| | S8 | S9 | S10 | S11 | S12 | S13 |
|---|---|---|---|---|---|---|
| K | 9.51507E+01 | −9.90000E+01 | −2.80210E−01 | 1.94675E+01 | −1.10893E+00 | −1.01661E+00 |
| $A_4$ | −1.22723E−01 | −1.19538E−01 | 1.15634E−02 | 3.63110E−02 | −1.77416E−01 | −1.95206E−01 |
| $A_6$ | 2.82425E−01 | 5.11849E−02 | −5.17087E−02 | 1.09181E−02 | 9.20513E−02 | 1.12200E−01 |
| $A_8$ | 2.17770E+00 | −3.22148E−01 | 2.65097E−02 | −6.90809E−02 | −5.56619E−02 | −6.10842E−02 |
| $A_{10}$ | 1.04627E+01 | 1.22550E+00 | −1.03708E−02 | 8.56154E−02 | 3.31673E−02 | 2.68234E−02 |
| $A_{12}$ | 3.27276E+01 | 2.66618E+00 | 8.62154E−03 | −6.47021E−02 | −1.33871E−02 | −8.91089E−03 |
| $A_{14}$ | 7.07229E+01 | 3.79194E+00 | −1.05251E−02 | 3.43917E−02 | 3.53000E−03 | 2.20781E−03 |
| $A_{16}$ | −1.09075E+02 | −3.72146E+00 | 8.21417E−03 | −1.34303E−02 | −6.30775E−04 | −4.07518E−04 |
| $A_{18}$ | 1.21886E+02 | 2.57879E+00 | −4.02417E−03 | 3.89085E−03 | 7.86365E−05 | 5.58886E−05 |
| $A_{20}$ | 9.89083E+01 | −1.26835E+00 | 1.29757E−03 | −8.31341E−04 | −6.92605E−06 | −5.64566E−06 |
| $A_{22}$ | 5.76936E+01 | 4.39183E−01 | −2.80203E−04 | 1.28739E−04 | 4.29107E−07 | 4.12740E−07 |
| $A_{24}$ | 2.35612E+01 | −1.04537E−01 | 4.01298E−05 | −1.39955E−05 | −1.82567E−08 | −2.11643E−08 |
| $A_{26}$ | 6.39141E+00 | 1.62750E−02 | −3.65781E−06 | 1.00941E−06 | 5.05659E−10 | 7.19855E−10 |
| $A_{28}$ | −1.03400E+00 | −1.49235E−03 | 1.92164E−07 | −4.32541E−08 | −8.15117E−12 | −1.45526E−11 |
| $A_{30}$ | 7.54672E−02 | 6.11348E−05 | −4.43111E−09 | 8.31714E−10 | 5.73151E−14 | 1.32130E−13 |

Figure 21:
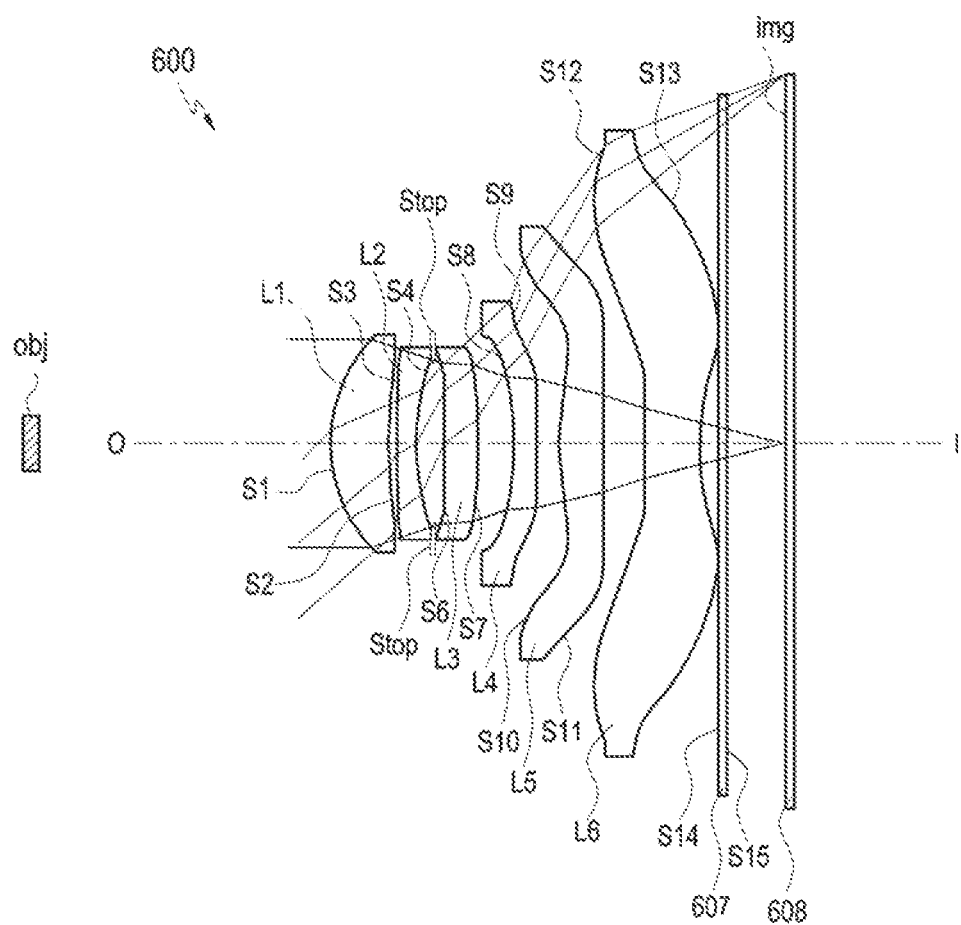
FIG. 21 is a diagram illustrating a lens assembly according to an embodiment.
Figure 22:
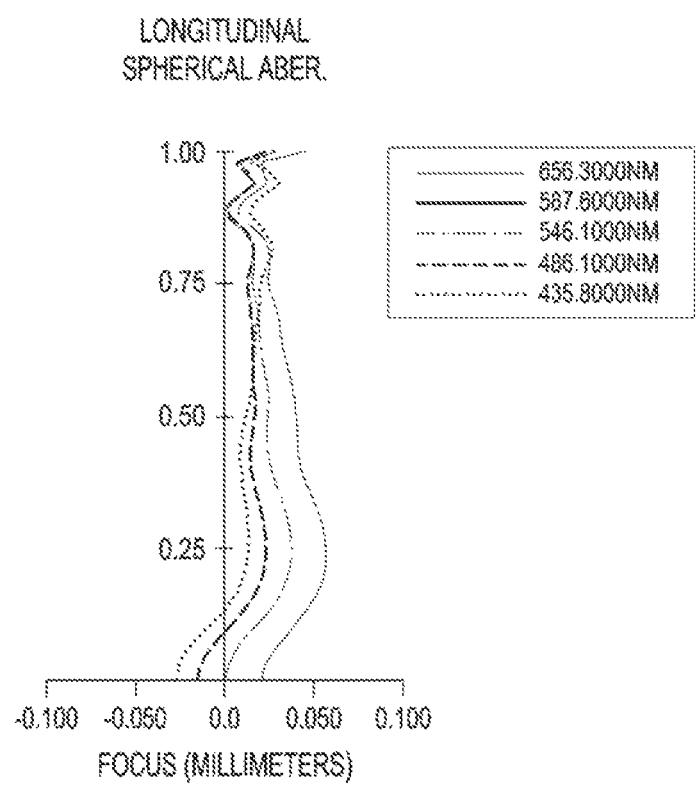
FIG. 22 is a graph illustrating a spherical aberration of the lens assembly in FIG. 21, according to an embodiment.
Figure 23:
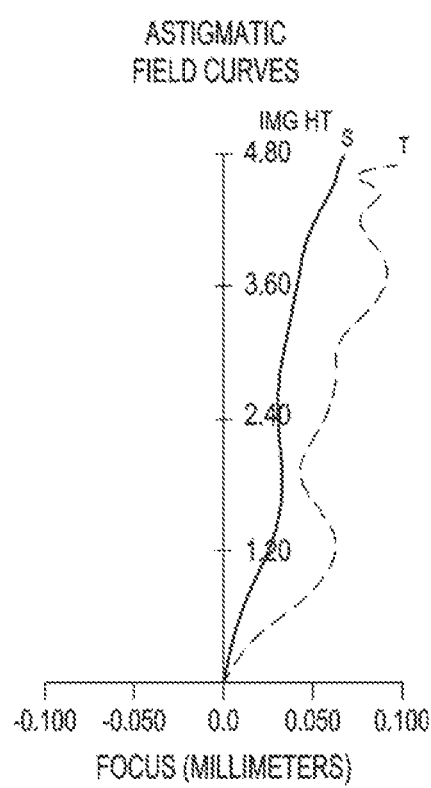
FIG. 23 is a graph illustrating an astigmatism of the lens assembly in FIG. 21, according to an embodiment.
Figure 24:
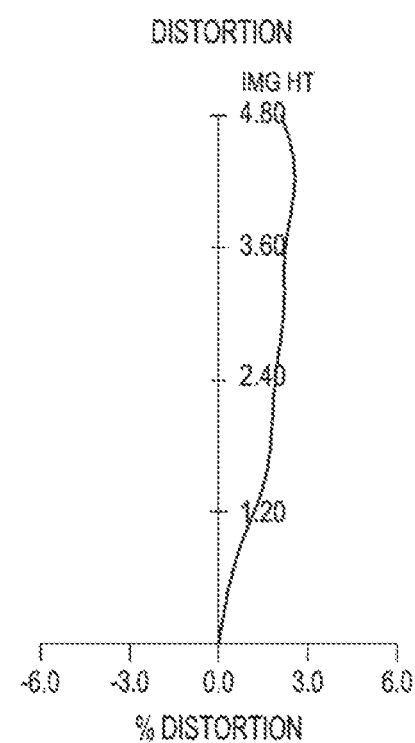
FIG. 24 is a graph illustrating a distortion of the lens assembly in FIG. 21, according to an embodiment.

FIG. 21 is a diagram illustrating a lens assembly 600 according an embodiment. FIG. 22 is a graph illustrating a spherical aberration of the lens assembly 600 according to an embodiment. FIG. 23 is a graph illustrating an astigmatism of the lens assembly 600 according to an embodiment. FIG. 24 is a graph illustrating a distortion of the lens assembly 600 according to an embodiment.

Referring to FIGS. 21-24, the lens assembly 600 according to still another embodiment of various embodiments of the disclosure may include multiple lenses (e.g., L1, L2, L3, L4, L5, and L6), an image sensor 608, and/or a filter 607.

[Table 16] below shows various lens data of the lens assembly 500, and [Table 17] and [Table 18] each show aspherical coefficients of multiple lenses (e.g., L1, L2, L3, L4, L5, and L6). The lens assembly 600 may satisfy the above-described requirements (and/or at least one of the above-described requirements) by having an F-number Fno of about 1.89, an angle or view of about 85.0 degrees, and a focal distance of about 5.12 mm.

TABLE 16

| Surface | Surface type | y Radius | Thickness | Nd | Vd |
| --- | --- | --- | --- | --- | --- |
| S0 | Sphere | infinity | infinity | | |
| S1 | Odd Polynomial | 1.862096011 | 0.780795476 | 1.54401 | 55.91 |
| S2 | Odd Polynomial | 6.331743007 | 0.127592775 | | |
| S3 | Odd Polynomial | 19.23389582 | 0.251654035 | 1.67073 | 19.22 |
| S4 | Odd Polynomial | 6.41718696 | 0.211316762 | | |
| Stop | Sphere | infinity | 0.142756482 | | |
| S6 | Odd Polynomial | 17.27761943 | 0.346595926 | 1.56592 | 37.51 |
| S7 | Odd Polynomial | 112.3164058 | 0.394638538 | | |
| S8 | Odd Polynomial | −14.3872117 | 0.316032579 | 1.64168 | 23.03 |
| S9 | Odd Polynomial | −553.428024 | 0.39426709 | | |
| S10 | Odd Polynomial | 4.61040896 | 0.559517786 | 1.51998 | 48.99 |
| S11 | Odd Polynomial | −18.0777419 | 0.552859419 | | |
| S12 | Odd Polynomial | 7.219156708 | 0.663813039 | 1.535 | 55.75 |
| S13 | Odd Polynomial | 1.843985371 | 0.182579574 | | |
| S14 | Sphere | infinity | 0.11 | 1.5168 | 64.2 |
| S15 | Sphere | infinity | 0.777000494 | | |
| img | Sphere | infinity | 0.018 | | |

TABLE 17

| | S1 | S2 | S3 | S4 | S6 | S7 |
| --- | --- | --- | --- | --- | --- | --- |
| K | −4.39818E−02 | −1.27497E+01 | −9.86888E+01 | 2.78510E−02 | 0.00000E+00 | −9.13856E+01 |
| $A_4$ | −8.75446E−03 | −2.26968E−02 | −4.14858E−03 | 2.11873E−02 | 0.00000E+00 | −6.24168E−02 |
| $A_6$ | 9.93709E−02 | 1.25789E−01 | −4.08865E−01 | −7.18166E−01 | 0.00000E+00 | 2.28845E−01 |
| $A_8$ | −5.95516E−01 | −1.58678E+00 | 3.94880E+00 | 1.00460E+01 | 0.00000E+00 | −1.94795E+00 |
| $A_{10}$ | 2.33301E+00 | 1.11849E+01 | −2.25905E+01 | −8.05180E+01 | 0.00000E+00 | 1.04089E+01 |
| $A_{12}$ | −6.05536E+00 | −4.79496E+01 | 8.78886E+01 | 4.18744E+02 | 0.00000E+00 | −3.79102E+01 |
| $A_{14}$ | 1.06844E+01 | 1.34630E+02 | −2.40722E+02 | 1.48312E+03 | 0.00000E+00 | 9.68297E+01 |
| $A_{16}$ | −1.30305E+01 | −2.58510E+02 | 4.73477E+02 | 3.68804E+03 | 0.00000E+00 | −1.75642E+02 |
| $A_{18}$ | 1.10213E+01 | 3.47700E+02 | −6.75170E+02 | −6.54771E+03 | 0.00000E+00 | 2.24922E+02 |
| $A_{20}$ | −6.37372E+00 | −3.30637E+02 | 6.97703E+02 | 8.33830E+03 | 0.00000E+00 | −1.97706E+02 |
| $A_{22}$ | 2.41265E+00 | 2.21208E+02 | −5.16410E+02 | −7.55522E+03 | 0.00000E+00 | 1.11257E+02 |
| $A_{24}$ | −5.33080E−01 | −1.01840E+02 | 2.66458E+02 | 4.75275E+03 | 0.00000E+00 | 3.25501E+01 |
| $A_{26}$ | 4.30420E−02 | 3.07098E+01 | −9.09114E+01 | 1.97235E+03 | 0.00000E+00 | −4.54659E−01 |
| $A_{28}$ | 6.31944E−03 | −5.46018E+00 | 1.84154E+01 | 4.85409E+02 | 0.00000E+00 | 3.24573E+00 |
| $A_{30}$ | −1.22547E−03 | 4.33894E−01 | −1.67565E+00 | −5.36456E+01 | 0.00000E+00 | −6.76768E−01 |

TABLE 18

| | S8 | S9 | S10 | S11 | S12 | S13 |
| --- | --- | --- | --- | --- | --- | --- |
| K | 8.42162E+01 | −9.90000E+01 | −3.83254E−01 | 1.39716E+01 | −9.04371E−01 | −1.01370E+00 |
| $A_4$ | −1.31951E−01 | −1.24527E−01 | 2.55261E−02 | 3.83774E−02 | −1.71990E−01 | −1.90615E−01 |
| $A_6$ | 3.79464E−01 | 8.36463E−02 | −1.01373E−01 | 1.08952E−02 | 9.03947E−02 | 1.16006E−01 |
| $A_8$ | −3.04567E+00 | −4.91579E−01 | 1.20107E−01 | −7.70978E−02 | −6.24383E−02 | −6.92793E−02 |
| $A_{10}$ | 1.51050E+01 | 1.79221E+00 | −1.24882E−01 | 1.00342E−01 | 4.04782E−02 | 3.28077E−02 |
| $A_{12}$ | −4.86690E+01 | −3.90881E+00 | 1.05963E−01 | −7.77601E−02 | −1.69786E−02 | −1.15098E−02 |

TABLE 18-continued

|  | S8 | S9 | S10 | S11 | S12 | S13 |
|---|---|---|---|---|---|---|
| $A_{14}$ | 1.07779E+02 | 5.63313E+00 | −7.04591E−02 | 4.12614E−02 | 4.58814E−03 | 2.96662E−03 |
| $A_{16}$ | −1.69402E+02 | −5.61424E+00 | 3.54093E−02 | −1.57086E−02 | −8.35411E−04 | −5.63452E−04 |
| $A_{18}$ | 1.91974E+02 | 3.95113E+00 | −1.31450E−02 | 4.36182E−03 | 1.05545E−04 | 7.88924E−05 |
| $A_{20}$ | −1.57371E+02 | −1.97353E+00 | 3.54380E−03 | −8.84072E−04 | −9.29533E−06 | −8.09942E−06 |
| $A_{22}$ | 9.24581E+01 | 6.94069E−01 | −6.79851E−04 | 1.29193E−04 | 5.19071E−07 | 6.03644E−07 |
| $A_{24}$ | 3.79524E+01 | −1.67831E−01 | 8.99647E−05 | −1.32238E−05 | 1.00874E−08 | −3.32514E−08 |
| $A_{26}$ | 1.03343E+01 | 2.65473E−02 | −7.77991E−06 | 8.94680E−07 | −1.23779E−08 | 1.78596E−09 |
| $A_{28}$ | −1.67695E+00 | −2.47313E−03 | 3.94949E−07 | −3.51162E−08 | 2.91848E−09 | −1.64147E−10 |
| $A_{30}$ | 1.22729E−01 | 1.02901E−04 | −8.91631E−09 | 5.24170E−10 | −2.94759E−10 | 1.29168E−11 |

In the above-described embodiments, various data regarding a lens may be identified with respect to the lens assembly (e.g., 100, 200, 300, 400, 500, and 600) and/or an electronic device including the lens assembly (e.g., 100, 200, 300, 400, 500, and 600). The data may satisfy the above-described requirements, for example, the results of [Equation 1] to [Equation 6].

TABLE 19

| | Embodiment | | | | | |
|---|---|---|---|---|---|---|
| | Embodiment 1 | Embodiment 2 | Embodiment 3 | Embodiment 4 | Embodiment 5 | Embodiment 9 |
| Equation 1 | 37.4 | 37.4 | 37.5 | 37.4 | 25.96 | 37.5 |
| Equation 2 | 37.4 | 37.4 | 42.5 | 37.4 | 37.4 | 49.0 |
| Equation 3 | 55.91 | 55.91 | 55.91 | 55.91 | 55.91 | 55.91 |
| Equation 4 | 1.67074 | 1.67074 | 1.67074 | 1.68039 | 1.68039 | 1.67074 |
| Equation 5 | 1.233 | 1.244 | 1.211 | 1.191 | 1.206 | 1.214 |
| Equation 6 | 0.227 | 0.247 | 0.220 | 0.219 | 0.219 | 0.227 |

In [Table 19], "Embodiment 1", "Embodiment 2", "Embodiment 3", "Embodiment 4", "Embodiment 5", and "Embodiment 6" may be referred to as the lens assembly 100 shown in FIG. 1, the lens assembly 200 shown in FIG. 5, the lens assembly 300 shown in FIG. 9, the lens assembly 400 shown in FIG. 13, the lens assembly 500 shown in FIG. 17, and the lens assembly 600 shown in FIG. 21, respectively.

The above-described lens assembly (e.g., 100, 200, 300, 400, 500, and 600) according to various embodiments may be mounted to an electronic device (e.g., an optical device) to be used. The electronic device (e.g., an optical device) may further include an application processor (AP) in addition to an image sensor (e.g., 108, 208, 308, 408, 508, and 608), and drive an operation system or an application program through the application processor AP to control multiple hardware or software components connected to the AP 21 and perform various data processing and operations. For example, the application processor AP may further include a graphic processing unit (GPU) and/or an image signal processor. When the image signal processor is included in the application processor AP, the image (or video) obtained by the image sensor (e.g., 108, 208, 308, 408, 508, and 608) may be stored or output by using the application processor AP.

Figure 25:
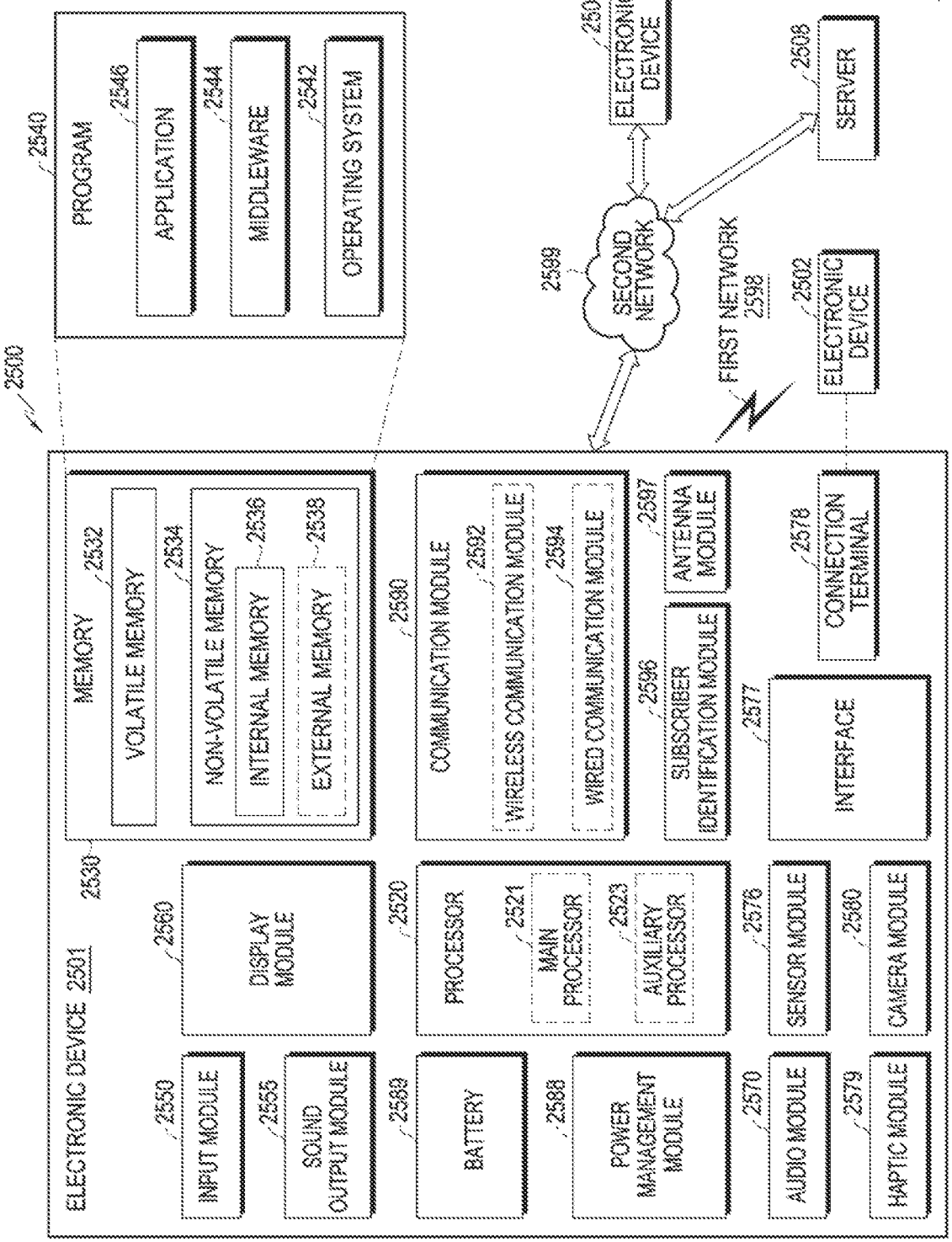
FIG. 25 is a block diagram illustrating an electronic device in a network environment, according to various embodiments.

FIG. 25 is a block diagram illustrating an electronic device 2501 (e.g., an optical device) in a network environment 2500 according to various embodiments. Referring to FIG. 25, the electronic device 2501 (e.g., an optical device) in the network environment 2500 may communicate with an electronic device 2502 via a first network 2598 (e.g., a short-range wireless communication network), or at least one of an electronic device 2504 or a server 2508 via a second network 2599 (e.g., a long-range wireless communication network). According to an embodiment, the electronic device 2501 may communicate with the electronic device 2504 via the server 2508. According to an embodiment, the electronic device 2501 may include a processor 2520, memory 2530, an input module 2550, a sound output module 2555, a display module 2560, an audio module 2570, a sensor module 2576, an interface 2577, a connecting terminal 2578, a haptic module 2579, a camera module 2580, a power management module 2588, a battery 2589, a communication module 2590, a subscriber identification module (SIM) 2596, or an antenna module 2597. In some embodiments, at least one of the components (e.g., the display device 2560 or the camera module 2580) may be omitted from the electronic device 2501, or one or more other components may be added in the electronic device 2501. In some embodiments, some of the components (e.g., the sensor module 2576, the camera module 2580, or the antenna module 2597) may be implemented as a single component (e.g., the display module 2560).

The processor 2520 may execute, for example, software (e.g., a program 2540) to control at least one other component (e.g., a hardware or software component) of the electronic device 2501 coupled with the processor 2520, and may perform various data processing or computation. According to one embodiment, as at least part of the data processing or computation, the processor 2520 may store a command or data received from another component (e.g., the sensor module 2576 or the communication module 2590) in volatile memory 2532, process the command or the data stored in the volatile memory 2532, and store resulting data in non-volatile memory 2534. According to an embodiment, the processor 2520 may include a main processor 2521 (e.g., a central processing unit (CPU) or an application processor (AP)), or an auxiliary processor 2523 (e.g., a graphics processing unit (GPU), a neural processing unit (NPU), an image signal processor (ISP), a sensor hub processor, or a communication processor (CP)) that is operable independently from, or in conjunction with, the main processor 2521. For example, when the electronic device 2501 includes the main processor 2521 and the auxiliary processor 2523, the auxiliary processor 2523 may be adapted to consume less power than the main processor 2521, or to be specific to a specified function. The auxiliary processor 2523 may be implemented as separate from, or as part of the main processor 2521.

The auxiliary processor 2523 may control, for example, at least some of functions or states related to at least one component (e.g., the display module 2560, the sensor module 2576, or the communication module 2590) among the components of the electronic device 2501, instead of the main processor 2521 while the main processor 2521 is in an inactive (e.g., sleep) state, or together with the main processor 2521 while the main processor 2521 is in an active (e.g., executing an application) state. According to an embodiment, the auxiliary processor 2523 (e.g., an image signal processor or a communication processor) may be implemented as part of another component (e.g., the camera module 2580 or the communication module 2590) functionally related to the auxiliary processor 2523. According to an embodiment, the auxiliary processor 2523 (e.g., the neural processing unit) may include a hardware structure specified for artificial intelligence model processing. An artificial intelligence model may be generated by machine learning. Such learning may be performed, e.g., by the electronic device 2501 where the artificial intelligence model is performed or via a separate server (e.g., the server 2508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2530 may store various data used by at least one component (e.g., the processor 2520 or the sensor module 2576) of the electronic device 2501. The various data may include, for example, software (e.g., the program 2540) and input data or output data for a command related thereto. The memory 2530 may include the volatile memory 2532 or the non-volatile memory 2534.

The program 2540 may be stored in the memory 2530 as software, and may include, for example, an operating system (OS) 2542, middleware 2544, or an application 2546.

The input module 2550 may receive a command or data to be used by another component (e.g., the processor 2520) of the electronic device 2501, from the outside (e.g., a user) of the electronic device 2501. The input module 2550 may include, for example, a microphone, a mouse, a keyboard, a key (e.g., a button), or a digital pen (e.g., a stylus pen).

The sound output module 2555 may output sound signals to the outside of the electronic device 2501. The sound output module 2555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2560 may visually provide information to the outside (e.g., a user) of the electronic device 2501. The display module 2560 may include, for example, a display, a hologram device, or a projector and control circuitry to control a corresponding one of the display, hologram device, and projector. According to an embodiment, the display module 2560 may include a touch sensor adapted to detect a touch, or a pressure sensor adapted to measure the intensity of force incurred by the touch.

The audio module 2570 may convert a sound into an electrical signal and vice versa. According to an embodiment, the audio module 2570 may obtain the sound via the input module 2550, or output the sound via the sound output module 2555 or an external electronic device (e.g., an electronic device 2502 (e.g., a speaker or a headphone)) directly or wirelessly coupled with the electronic device 2501.

The sensor module 2576 may detect an operational state (e.g., power or temperature) of the electronic device 2501 or an environmental state (e.g., a state of a user) external to the electronic device 2501, and then generate an electrical signal or data value corresponding to the detected state. According to an embodiment, the sensor module 2576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2577 may support one or more specified protocols to be used for the electronic device 2501 to be coupled with the external electronic device (e.g., the electronic device 2502) directly or wirelessly. According to an embodiment, the interface 2577 may include, for example, a high definition multimedia interface (HDMI), a universal serial bus (USB) interface, a secure digital (SD) card interface, or an audio interface.

A connecting terminal 2578 may include a connector via which the electronic device 2501 may be physically connected with the external electronic device (e.g., the electronic device 2502). According to an embodiment, the connecting terminal 2578 may include, for example, an HDMI connector, a USB connector, an SD card connector, or an audio connector (e.g., a headphone connector).

The haptic module 2579 may convert an electrical signal into a mechanical stimulus (e.g., a vibration or a movement) or electrical stimulus which may be recognized by a user via his tactile sensation or kinesthetic sensation. According to an embodiment, the haptic module 2579 may include, for example, a motor, a piezoelectric element, or an electric stimulator.

The camera module 2580 may capture a still image or moving images. According to an embodiment, the camera module 2580 may include one or more lenses, image sensors, image signal processors, or flashes.

The power management module 2588 may manage power supplied to the electronic device 2501. According to one embodiment, the power management module 2588 may be implemented as at least part of, for example, a power management integrated circuit (PMIC).

The battery 2589 may supply power to at least one component of the electronic device 2501. According to an embodiment, the battery 2589 may include, for example, a primary cell which is not rechargeable, a secondary cell which is rechargeable, or a fuel cell.

The communication module 2590 may support establishing a direct (e.g., wired) communication channel or a wireless communication channel between the electronic device 2501 and the external electronic device (e.g., the electronic device 2502, the electronic device 2504, or the server 2508) and performing communication via the established communication channel. The communication module 2590 may include one or more communication processors that are operable independently from the processor 2520 (e.g., the application processor (AP)) and supports a direct (e.g., wired) communication or a wireless communication. According to an embodiment, the communication module 2590 may include a wireless communication module 2592 (e.g., a cellular communication module, a short-range wireless communication module, or a global navigation satellite system (GNSS) communication module) or a wired communication module 2594 (e.g., a local area network (LAN) communication module or a power line communication (PLC) module). A corresponding one of these communication modules may communicate with the external electronic device 2504 via the first network 2598 (e.g., a short-range communication network, such as Bluetooth™, wireless-fidelity (Wi-Fi) direct, or infrared data association (IrDA)) or the second network 2599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2592 may identify or authenticate the electronic device 2501 in a communication network, such as the first network 2598 or the second network 2599, using subscriber information (e.g., international mobile subscriber identity (IMSI)) stored in the subscriber identification module 2596.

The wireless communication module 2592 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2592 may support a high-frequency band (e.g., the mm Wave band) to achieve, e.g., a high data transmission rate. The wireless communication module 2592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2592 may support various requirements specified in the electronic device 2501, an external electronic device (e.g., the electronic device 2504), or a network system (e.g., the second network 2599). According to an embodiment, the wireless communication module 2592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2597 may transmit or receive a signal or power to or from the outside (e.g., the external electronic device) of the electronic device 2501. According to an embodiment, the antenna module 2597 may include an antenna including a radiating element composed of a conductive material or a conductive pattern formed in or on a substrate (e.g., a printed circuit board (PCB)). According to an embodiment, the antenna module 2597 may include a plurality of antennas (e.g., array antennas). In such a case, at least one antenna appropriate for a communication scheme used in the communication network, such as the first network 2598 or the second network 2599, may be selected, for example, by the communication module 2590 from the plurality of antennas. The signal or the power may then be transmitted or received between the communication module 2590 and the external electronic device via the selected at least one antenna. According to an embodiment, another component (e.g., a radio frequency integrated circuit (RFIC)) other than the radiating element may be additionally formed as part of the antenna module 2597.

According to various embodiments, the antenna module 2597 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2501 and the external electronic device 2504 via the server 2508 coupled with the second network 2599. Each of the external electronic devices 2502 or 2504 may be a device of a same type as, or a different type, from the electronic device 2501. According to an embodiment, all or some of operations to be executed at the electronic device 2501 may be executed at one or more external devices of the external electronic devices 2502, 2504, or 2508. For example, if the electronic device 2501 should perform a function or a service automatically, or in response to a request from a user or another device, the electronic device 2501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2501. The electronic device 2501 may provide the outcome, with or without further processing of the outcome, as at least part of a reply to the request. To that end, a cloud computing, distributed computing, mobile edge computing (MEC), or client-server computing technology may be used, for example.

The electronic device 2501 may provide ultra low-latency services using, e.g., distributed computing or mobile edge computing. In another embodiment, the external electronic device 2504 may include an internet-of-things (IoT) device. The server 2508 may be an intelligent server using machine learning and/or a neural network. According to an embodiment, the external electronic device 2504 or the server 2508 may be included in the second network 2599. The electronic device 2501 may be applied to intelligent services (e.g., smart home, smart city, smart car, or healthcare) based on 5G communication technology or IoT-related technology.

Figure 26:
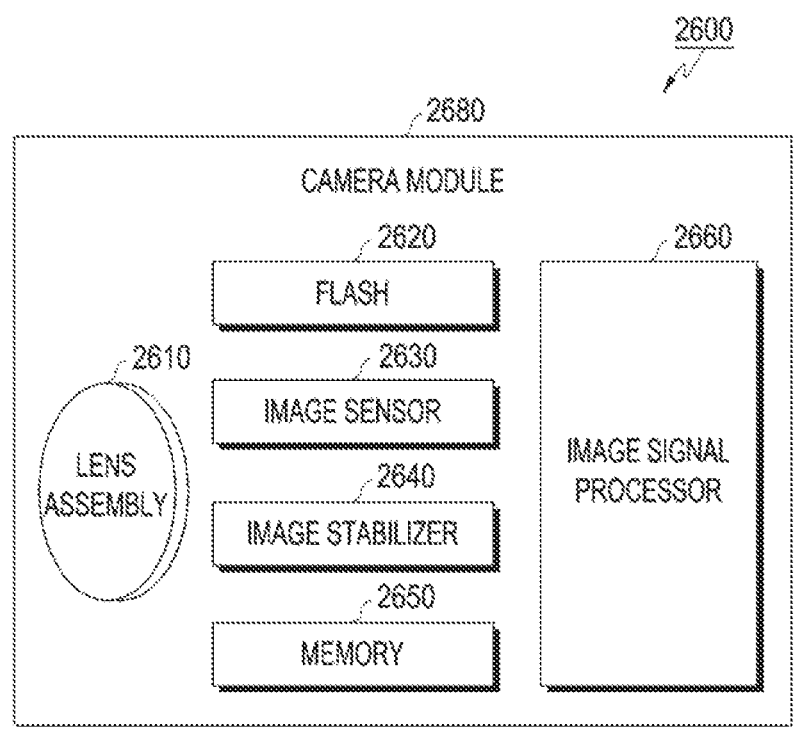
FIG. 26 is a block diagram illustrating a camera module, according to various embodiments.

FIG. 26 is a block diagram 2600 illustrating a camera module 2680 according to various embodiments. Referring to FIG. 26, the camera module 2680 may include a lens assembly 2610 (e.g., the lens assembly 100 of FIG. 1, the lens assembly 200 of FIG. 5, the lens assembly 300 of FIG. 9, the lens assembly 400 of FIG. 13, the lens assembly 500 of FIG. 17, and the lens assembly 600 of FIG. 21), a flash 2620, an image sensor 2630 (e.g., the image sensor 108 of FIG. 1, the image sensor 208 of FIG. 5, the image sensor 308 of FIG. 9, the image sensor 408 of FIG. 13, the image sensor 508 of FIG. 17, and the image sensor 608 of FIG. 21), an image stabilizer 2640, a memory 2650 (e.g., a buffer memory) (e.g., the memory 2530 of FIG. 25), or an image signal processor 2660. The lens assembly 2610 may collect light emitted from an object which is a target to be image photographed. The lens assembly 2610 may include one or more lenses. According to an embodiment, the camera module 2680 may include multiple lens assemblies 2610. Here, the camera module 2680 may form, for example, a dual camera, a 360-degree camera, a spherical camera. Some of the multiple lens assemblies 2610 may have the same attribute (e.g., an angle of view, a focal length, an auto focus, an F-number (Fno), or an optical zoom), or at least one lens assembly may have one or more lens attributes other than lens attributes of other lens assembly. The lens assembly 2610 may include, for example, a wide-angle or a telephoto lens.

The flash 2620 may emit light used for reinforcing light emitted or reflected from an object. According to an embodiment, the flash 2620 may include one or more light-emitting diodes (e.g., a red-green-blue (RGB) LED, a white LED, an infrared LED, or an ultraviolet LED), or a xenon lamp. The image sensor 2630 may convert light emitted or reflected from an object and transferred through the lens assembly 2610 into an electrical signal to obtain an image corresponding to the object. According to an embodiment, the image sensor 2630 may include one image sensor selected from image sensors having different attributes, such as an RGB sensor, a black and white (BW) sensor, an IR sensor, or a UV sensor, multiple image sensors having the same attribute, or multiple image sensors having different attributes. Each image sensor included in the image sensor 2630 may be implemented by using, for example, a charged coupled device sensor (CCD) or a complementary metal oxide semiconductor (CMOS) sensor.

The image stabilizer 2640 may move at least one lens included in the lens assembly 2610 or the image sensor 2630 in a predetermined direction or control (e.g., adjusting a read-out timing and the like) operational characteristics of the image sensor 2630, in response to movement of the camera module 2680 or the electronic device 2501 including the camera module. Therefore, a negative effect of the movement on a photographed image may be at least partially compensated. According to an embodiment, the image stabilizer 2640 may detect such movement of the camera module 2680 or the electronic device 2501 by using a gyro sensor or an acceleration sensor disposed inside or outside the camera module 2680. According to an embodiment, the image stabilizer 2640 may be implemented as, for example, an optical image stabilizer. The memory 2650 may store at least a portion of the image obtained through the image sensor 2630 at least temporarily for a next image processing operation. For example, when an image obtainment is delayed due to a shutter or multiple images are obtained at high speed, the obtained original image (e.g., a Bayer-patterned image or an image having high resolution) is stored in the memory 2650 and a copy image (e.g., an image having low resolution) corresponding thereto may be previewed through a display device 2560. Thereafter, when a designated requirement is satisfied (e.g., a user input or system command), at least a portion of the original image stored in the memory 2650 may be obtained and processed by, for example, the image signal processor 2660. According to an embodiment, the memory 2650 may include a separate memory operating as at least a portion of or operating independently from the memory 2630.

The image signal processor 2660 may perform one or more image processing with respect to the image obtained through the image sensor 2630 or the image stored in the memory 2650. The one or more image processing may include, for example, depth map generation, three-dimensional modeling, panorama generation, feature point extraction, image synthesis, or image compensation (e.g., noise reduction, resolution adjustment, brightness adjustment, blurring, sharpening, or softening). Additionally or alternatively, the image signal processor 2660 may perform control (e.g., exposure time control or read out timing control) with respect to at least one (e.g., the image sensor 2630) of components included in the camera module 2680. The image having been processed by the image signal processor 2660 may be restored in the memory 2650 for an additional processing, or provided to an external component (e.g., the memory 2530, the display device 2560, an electronic device 2502, an electronic device 2504, or a server 2508) of the camera module 2680. According to an embodiment, the image signal processor 2660 may be configured to be at least a portion of the processor 2520, or a separate processor operating independently from the processor 2520. When the image signal processor 2660 is configured to be a processor separated from the processor 2520, at least one image having been processed by the image signal processor 2660 may be displayed through the display device 2660 as is or after additional image processing by the processor 2620.

According to an embodiment, the electronic device 2501 may include multiple camera modules 2680 having different attributes or the same attribute. Here, for example, at least one of the multiple camera modules 2680 may be a wide-angle camera and at least another camera may be a telephoto camera. Similarly, at least one of the multiple camera modules 2680 may be a front camera and at least another camera may be a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term in various embodiments of the disclosure "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2540) including one or more instructions that are stored in a storage medium (e.g., internal memory 2536 or external memory 2538) that is readable by a machine (e.g., the electronic device 2501). For example, a processor (e.g., the processor 2520) of the machine (e.g., the electronic device 2501) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, there may be provided an electronic device (e.g., the electronic device 2501 of FIG. 25) including a lens assembly (e.g., the lens assemblies 100, 200, 300, 400, 500, 600 of FIG. 1, FIG. 5, FIG. 9, FIG. 13, FIG. 17, and FIG. 21) having multiple lenses are arranged in a direction along an optical axis directing from an object side to an image side, the lens assembly including a first lens (e.g., the first lenses L1 of FIG. 1, FIG. 5, FIG. 9, FIG. 13, FIG. 17, and FIG. 21) having a convex surface facing the object side in a first direction parallel to the optical axis, a second lens (e.g., the second lenses L2 of FIG. 1, FIG. 5, FIG. 9, FIG. 13, FIG. 17, and FIG. 21) having a convex surface facing the first direction, a third lens (e.g., the third lenses L3 of FIG. 1, FIG. 5, FIG. 9, FIG. 13, FIG. 17, and FIG. 21) having a positive refractive power; a fourth lens (e.g., the fourth lenses L4 of FIG. 1, FIG. 5, FIG. 9, FIG. 13, FIG. 17, and FIG. 21), a fifth lens (e.g., the fifth lenses L5 of FIG. 1, FIG. 5, FIG. 9, FIG. 13, FIG. 17, and FIG. 21) having a positive refractive power, and a sixth lens (e.g., the sixth lenses L6 of FIG. 1, FIG. 5, FIG. 9, FIG. 13, FIG. 17, and FIG. 21); and an image sensor (e.g., the image sensors 108, 208, 308, 408, 508, 608 of FIG. 1, FIG. 5, FIG. 9, FIG. 13, FIG. 17, and FIG. 21) including a imaging plane on which an image is formed. The lens assembly satisfies [Equation 1] and [Equation 2] below.

$$25 \leq V_{d3} \leq 50 \quad \text{[Equation 1]}$$

$$25 \leq V_{d5} \leq 50 \quad \text{[Equation 2]}$$

($V_{d3}$ of [Equation 1] is an Abbe's number of the third lens, and $V_{d5}$ of [Equation 2] is an Abbe's number of the fifth lens)

According to various embodiment, the lens assembly may satisfy [Equation 3] below.

$$50 \leq V_{d1} \leq 60 \quad \text{[Equation 3]}$$

($V_{d1}$ of [Equation 3] is an Abbe's number of the first lens)

According to various embodiment, the lens assembly may satisfy [Equation 4] below.

$$1.65 \leq n_{d2} \leq 1.75 \quad \text{[Equation 4]}$$

($n_{d2}$ of [Equation 4] is a refractive index of the second lens)

According to various embodiments, the third lens may be configured to be a lens having a convex shape in a chief portion adjacent to the optical axis.

According to various embodiments, the fourth lens may be configured to be a lens having a concave shape in a chief portion adjacent to the optical axis.

According to various embodiments, a surface of the fifth lens facing the object side may have at least one inflection point.

According to various embodiments, each of a surface of the first lens facing the object side and a surface of the first lens facing the image side may have at least one inflection point.

According to various embodiments, the first lens may have a positive refractive power and the second lens may have a negative refractive power.

According to various embodiments, the sixth lens may have a negative refractive power.

According to various embodiment, the lens assembly may satisfy [Equation 5] below.

$$1.1 \leq \frac{Oal}{IH} \leq 1.4 \qquad \text{[Equation 5]}$$

(Oal is a distance from a surface of the first lens facing the object side to the imaging plane of the image sensor, and IH is a maximum height of the imaging plane of the image sensor)

According to various embodiment, the lens assembly may satisfy [Equation 6] below.

$$0.14 \leq \frac{Bfl}{IH} \leq 0.25 \qquad \text{[Equation 6]}$$

(Bfl is a distance from a surface of the sixth lens facing the image side to the imaging plane of the image sensor, and IH is a maximum height of the imaging plane of the image sensor)

According to various embodiments, the lens assembly may be configured to have an angle of view of 85 degrees or more.

According to various embodiments, a half of a diagonal length of the image sensor may be 4.8 mm or more.

According to various embodiment, the lenses included in the lens assembly may be formed of a synthetic resin material.

According to various embodiments, a stop may be included between the second lens and the third lens.

According to various embodiments of the disclosure, there may be provided an electronic device (e.g., the electronic device 2501 of FIG. 25) including a lens assembly (e.g., the lens assemblies 100, 200, 300, 400, 500, 600 of FIG. 1, FIG. 5, FIG. 9, FIG. 13, FIG. 17, and FIG. 21) having multiple lenses arranged in a direction along an optical axis from an object side to an image side, the lens assembly including a first lens (e.g., the first lenses L1 of FIG. 1, FIG. 5, FIG. 9, FIG. 13, FIG. 17, and FIG. 21) having a positive refractive power having a convex surface facing the object side in a first direction parallel to the optical axis, and having a first Abbe's number value, a second lens (e.g., the second lenses L2 of FIG. 1, FIG. 5, FIG. 9, FIG. 13, FIG. 17, and FIG. 21) having a negative refractive power, a convex surface facing the first direction, and a second Abbe's number value, a third lens (e.g., the third lenses L3 of FIG. 1, FIG. 5, FIG. 9, FIG. 13, FIG. 17, and FIG. 21) having a positive refractive power and a third Abbe's number value, a fourth lens (e.g., the fourth lenses L4 of FIG. 1, FIG. 5, FIG. 9, FIG. 13, FIG. 17, and FIG. 21) having a negative refractive power and fourth Abbe's number value, a fifth lens (e.g., the fifth lenses L5 of FIG. 1, FIG. 5, FIG. 9, FIG. 13, FIG. 17, and FIG. 21) having a positive refractive power and a fifth Abbe's number value, and a sixth lens (e.g., the sixth lenses L6 of FIG. 1, FIG. 5, FIG. 9, FIG. 13, FIG. 17, and FIG. 21) having a negative refractive power and a sixth Abbe's number value; and an image sensor (e.g., the image sensors 108, 208, 308, 408, 508, 608 of FIG. 1, FIG. 5, FIG. 9, FIG. 13, FIG. 17, and FIG. 21) including an imaging plane on which an image is formed. The third Abbe's number value is smaller than the first Abbe's number value and is larger than the second Abbe's number value, and wherein the fifth Abbe's number value is smaller than the sixth Abbe's number value, and is larger than the fourth Abbe's number value.

As mentioned above, in the detailed description regarding various embodiments of the disclosure, specific embodiments have been described, but it will be apparent to those of ordinary skill in the art that various modifications are possible without departing from the subject matter of the disclosure. For example, the dimensions of the multiple lenses and the like may be appropriately configured depending on a structure and requirement of an actual lens assembly to be manufactured or an electronic device on which such lens assembly will be mounted, the actual use environment, and the like.

What is claimed is:

1. An electronic device comprising:
   a lens assembly having multiple lenses arranged in a direction along an optical axis from an object side to an image side, the lens assembly comprising:
      a first lens having a convex surface facing the object side in a first direction parallel to the optical axis,
      a second lens having a convex surface facing the first direction,
      a third lens having a positive refractive power,
      a fourth lens,
      a fifth lens having a positive refractive power, and
      a sixth lens; and
   an image sensor comprising an imaging plane on which an image is formed,
   wherein the lens assembly satisfies [Equation 1] and [Equation 2] below, $$25 \leq V_{d3} \leq 50 \qquad \text{[Equation 1]}$$

$$25 \leq V_{d5} \leq 50 \qquad \text{[Equation 2]}$$

wherein $V_{d3}$ of [Equation 1] is an Abbe's number of the third lens, and
   $V_{d5}$ of [Equation 2] is an Abbe's number of the fifth lens, and
   wherein a surface of the third lens facing the object side is configured to be convex shape toward the object side in a chief portion adjacent to the optical axis, and a surface of the fourth lens is configured to have a concave shape in a chief portion adjacent to the optical axis.

2. The electronic device of claim 1,
   wherein the lens assembly satisfies [Equation 3] below, $$50 \leq V_{d1} \leq 60 \qquad \text{[Equation 3]}$$

wherein $V_{d1}$ of [Equation 3] is an Abbe's number of the first lens.

3. The electronic device of claim 1,
   wherein the lens assembly satisfies [Equation 4] below, $$1.65 \leq n_{d2} \leq 1.75 \qquad \text{[Equation 4]}$$

wherein $n_{d2}$ of [Equation 4] is a refractive index of the second lens.

4. The electronic device of claim 1,
   wherein a surface of the fifth lens facing the object side has at least one inflection point.

5. The electronic device of claim 1,
   wherein each of a surface of the sixth lens facing the object side and a surface of the sixth lens facing the image side has at least one inflection point.

6. The electronic device of claim 1,
   wherein the first lens has a positive refractive power and the second lens has a negative refractive power.

7. The electronic device of claim 1, wherein the sixth lens has a negative refractive power.

8. The electronic device of claim 1, wherein the lens assembly satisfies [Equation 5] below, $$1.1 \leq \frac{Oal}{IH} \leq 1.4,\quad \text{[Equation 5]}$$

wherein Oal is a distance from a surface of the first lens facing the object side to the imaging plane of the image sensor, and IH is a maximum height of the imaging plane of the image sensor.

9. The electronic device of claim 1, wherein the lens assembly satisfies [Equation 6] below, $$0.14 \leq \frac{Bfl}{IH} \leq 0.25\quad \text{[Equation 6]}$$

wherein Bfl is a distance from a surface of the sixth lens facing the image side to the imaging plane of the image sensor, and IH is a maximum height of the imaging plane of the image sensor.

10. The electronic device of claim 1, wherein the lens assembly is configured to have an angle of view of at least 85 degrees.

11. The electronic device of claim 1, wherein a half of a diagonal length of the image sensor is at least 4.8 mm.

12. The electronic device of claim 1, wherein the multiple lenses are formed of a synthetic resin material.

13. The electronic device of claim 1, further comprising: a stop disposed between the second lens and the third lens.

14. An electronic device comprising:
a lens assembly having multiple lenses arranged in a direction along an optical axis from an object side to an image side, the lens assembly comprising:
   a first lens having a positive refractive power, having a convex surface facing the object side in a first direction parallel to the optical axis, and having a first Abbe's number value,
   a second lens having a negative refractive power, having a convex surface facing the first direction, and having a second Abbe's number value,
   a third lens having a positive refractive power and having a third Abbe's number value,
   a fourth lens having a negative refractive power and having a fourth Abbe's number,
   a fifth lens having a positive refractive power and having a fifth Abbe's number value, and
   a sixth lens having a negative refractive power and having a sixth Abbe's number value; and
an image sensor comprising an imaging plane on which an image is formed,
wherein the third Abbe's number value is smaller than the first Abbe's number value, and is larger than the second Abbe's number value,
wherein the fifth Abbe's number value is smaller than the sixth Abbe's number value, and is larger than the fourth Abbe's number value, and
wherein a surface of the third lens facing the object side is configured to be convex shape toward the object side in a chief portion adjacent to the optical axis, and a surface of the fourth lens is configured to have a concave shape in a chief portion adjacent to the optical axis.

15. The electronic device of claim 14, wherein the multiple lenses are formed of a synthetic resin material.

16. The electronic device of claim 15, wherein the lens assembly satisfies Equation (4):

$$1.65 \leq n_{d2} \leq 1.75 \quad [4],$$

wherein $n_{d2}$ is a refractive index of the second lens.

17. The electronic device of claim 14, wherein a half of a diagonal length of the image sensor is at least 4.8 mm.

18. The electronic device of claim 14, further comprising: a stop disposed between the second lens and the third lens.

* * * * *